United States Patent
Terranova et al.

(10) Patent No.: US 7,142,811 B2
(45) Date of Patent: Nov. 28, 2006

(54) WIRELESS COMMUNICATION OVER A TRANSDUCER DEVICE

(75) Inventors: Domenic F. Terranova, N. Andover, MA (US); Vincent Palermo, Westford, MA (US)

(73) Assignee: Aura Communications Technology, Inc., North Andover, MA (US)

( * ) Notice: Subject to any disclaimer, the term of this patent is extended or adjusted under 35 U.S.C. 154(b) by 372 days.

(21) Appl. No.: 10/004,989

(22) Filed: Dec. 3, 2001

(65) Prior Publication Data

US 2002/0160722 A1  Oct. 31, 2002

Related U.S. Application Data

(63) Continuation-in-part of application No. 09/942,372, filed on Aug. 29, 2001, now abandoned.

(60) Provisional application No. 60/296,229, filed on Jun. 6, 2001, provisional application No. 60/276,398, filed on Mar. 16, 2001.

(51) Int. Cl.
  H04B 5/00    (2006.01)
  H04B 7/00    (2006.01)
  H04B 1/40    (2006.01)
  H04B 1/44    (2006.01)
  H04B 1/46    (2006.01)
  H04B 4/02    (2006.01)
  H01Q 11/12   (2006.01)

(52) U.S. Cl. .................. 455/41.1; 455/41.2; 455/77; 455/78; 455/80; 455/562.1; 455/107; 455/120; 455/121; 455/126

(58) Field of Classification Search ...... 455/3.05–3.06, 455/41.1–41.3, 74.1, 75, 77, 78, 569.1, 571, 455/572, 573, 574, 575.2, 575.6, 90.1, 95, 455/107, 120–126, 462, 464, 3.01, 465, 517, 455/522, 526, 62, 63.1, 63.4, 67.11, 76–83, 455/550.1, 569.2; 340/10.1, 10.4, 870.31, 340/870.32, 854.8, 855.1, 941, 445, 448, 340/531, 538.15, 538.16, 310.17; 375/333, 375/257, 258, 222, 219
See application file for complete search history.

(56) References Cited

U.S. PATENT DOCUMENTS 3,864,662 A    2/1975  David et al.

(Continued)

FOREIGN PATENT DOCUMENTS

EP    0 367 797 B1    8/2003

(Continued)

*Primary Examiner*—Charles Appiah
*Assistant Examiner*—Meless Zewdu
(74) *Attorney, Agent, or Firm*—Hamilton, Brook, Smith & Reynolds, P.C.

(57) ABSTRACT

One aspect of the present invention is generally directed towards a system and method of tuning a transducer for transmitting and receiving a wireless signal. In an illustrative embodiment, a single transducer is coupled to a first or second circuit for either transmitting or receiving, respectively. Generally, electrical characteristics of the first circuit are adjusted to increase a magnetic field generated by the transducer. Conversely, electrical characteristics of the second circuit are adjusted to increase a signal generated by the transducer for receiving a magnetic field. Accordingly, a single transducer device can be tuned for either transmitting or receiving a corresponding wireless signal.

17 Claims, 24 Drawing Sheets

U.S. PATENT DOCUMENTS

| | | | |
|---|---|---|---|
| 3,906,405 A * | 9/1975 | Kommrush | 333/17 R |
| 4,334,315 A | 6/1982 | Ono et al. | |
| 4,542,532 A * | 9/1985 | McQuilkin | 455/41 |
| 4,799,066 A * | 1/1989 | Deacon | 343/861 |
| 4,865,607 A * | 9/1989 | Wilkins et al. | 343/861 |
| 4,879,738 A * | 11/1989 | Petro | 379/3 |
| 5,124,699 A * | 6/1992 | Tervoert et al. | 340/825.54 |
| 5,321,668 A | 6/1994 | Rouquette | |
| 5,345,231 A | 9/1994 | Koo et al. | |
| 5,425,032 A * | 6/1995 | Shloss et al. | 340/825.54 |
| 5,568,516 A * | 10/1996 | Strohallen et al. | 375/259 |
| 5,596,638 A | 1/1997 | Paterson et al. | |
| 5,701,121 A | 12/1997 | Murdoch | |
| 5,787,174 A | 7/1998 | Tuttle | |
| 5,812,598 A * | 9/1998 | Sharma et al. | 375/259 |
| 5,825,299 A | 10/1998 | Fuentes et al. | |
| 5,831,348 A * | 11/1998 | Nishizawa | 307/104 |
| 5,912,925 A * | 6/1999 | Palermo et al. | 375/258 |
| 5,966,641 A * | 10/1999 | Flowerdew | 455/41 |
| 5,982,764 A * | 11/1999 | Palermo et al. | 370/345 |
| 6,369,550 B1 * | 4/2002 | Lou et al. | 323/208 |
| 6,424,820 B1 * | 7/2002 | Burdick et al. | 455/41 |
| 6,466,131 B1 * | 10/2002 | Tuttle et al. | 340/572.7 |
| 6,570,914 B1 * | 5/2003 | Ichihara | 375/224 |

FOREIGN PATENT DOCUMENTS

| | | |
|---|---|---|
| GB | 2 161 342 A | 1/1986 |
| WO | WO 96/37052 * | 11/1996 |
| WO | WO 99/38272 * | 7/1999 |

* cited by examiner

WIRELESS COMMUNICATION OVER A TRANSDUCER DEVICE

RELATED APPLICATION(S)

This application is a Continuation-in-part of U.S. application Ser. No. 09/942,372, entitled "Wireless Communication over a Transducer Device," filed on Aug. 29, 2001, which itself claims the benefit of U.S. Provisional Application No. 60/296,229 entitled "System and Method for Wireless Communication," filed on Jun. 6, 2001 and U.S. Provisional Application No. 60/276,398 entitled "Techniques for a Wireless Communication System," filed on Mar. 16, 2001, the entire teachings of all of which are incorporated herein by reference.

BACKGROUND OF THE INVENTION

Inductive antenna devices have been incorporated in transceivers to transmit and receive wireless signals for quite some time. In a typical application, a transceiver device supporting bi-directional communication includes two specifically tuned antennas, one of which is tuned for transmitting while the other is tuned for receiving.

Unlike RF (Radio Frequency) antennas, inductive antennas are often independently tuned for more efficiently transmitting or receiving wireless signals. For example, inductive antennas used for transmitting are generally tuned so they effectively have a low impedance. Conversely, inductive antennas used for receiving are typically tuned so they effectively have a high impedance. Most inductive systems supporting two-way communications include separate antenna devices, each of which is tuned for either transmitting or receiving at a particular carrier frequency.

SUMMARY OF THE INVENTION

Recent advancements in integrated circuit technology render it possible to reduce an overall size of wireless transceiver devices. Additionally, the size and weight of power sources for powering corresponding wireless devices has been reduced to support increased portability. That is, wireless transceiver devices are now smaller than ever before. As a result, a relative size and weight associated with the use of individual antennas for transmitting and receiving can be prohibitive due to space restrictions in certain wireless applications.

It would be an advancement in the art to reduce the power, cost, size and weight of a transceiver system such as a transducer and related circuitry for transmitting and receiving wireless signals based on inductive coupling.

One aspect of the present invention is generally directed towards a system and method of tuning a transducer for transceiving, i.e., transmitting or receiving, wireless signals. In an illustrative embodiment, a single transducer is coupled to a circuit for either transmitting or receiving. Generally, electrical characteristics of the circuit can be adjusted to increase a magnetic field generated by the transducer. Characteristics of the circuit also can be adjusted for receiving a magnetic field. Accordingly, a single transducer device can be tuned for either transmitting or receiving a wireless signal.

In one application, the circuit to which the transducer is coupled is broken into two components such as first and second circuits. The transducer can be coupled to and tuned by the first circuit for transmitting, while the transducer can be coupled to and tuned by the second circuit for receiving. Characteristics of the first and second circuits can be adjusted using passive circuit components such as capacitors, inductors and resistors. Such circuit components are typically inexpensive and can be easily mounted to a circuit board. Further, the first and second circuits can include active circuits for tuning the transducer for transmitting or receiving.

In a specific application, a capacitance of the first circuit can be adjusted to reduce an effective impedance of the transducer for transmitting a wireless signal. Also, a capacitance of the second circuit can be adjusted to increase an effective impedance of the transducer for receiving a wireless signal. Accordingly, a single transducer can be switched or time-multiplexed between the first and second circuits to support bidirectional communication with a transceiver device at a remote location. By adjusting the electrical characteristics of a corresponding circuit, higher coupling efficiency can be achieved between the tuned transducer and a remote transmitter or receiver.

The first and second circuits can be adjusted for transmitting and receiving at different carrier frequencies. For example, a reactance or impedance of the first circuit can be adjusted for transmitting a magnetically encoded signal at a first carrier frequency while characteristics of the second circuit can be adjusted to receive a magnetically encoded signal at a second carrier frequency.

Further, the first or second circuit can be adjusted for respectively transmitting or receiving over the transducer at different frequencies during different time intervals. More specifically, the transducer and first circuit can be adjusted to transmit at a first carrier frequency for a first time interval, and the transducer and first circuit can be adjusted or tuned to transmit at a second carrier frequency during another time interval. Also, the transducer can be adjusted to receive on two different carrier frequencies during two different time intervals by adjusting the second circuit when coupled to the transducer. Thus, a single transducer can be dynamically tuned in the field to transmit at multiple carrier frequencies and receive at multiple carrier frequencies.

One method of tuning the transducer for transmitting involves disposing an inductive element in the second circuit. Preferably, the inductive element has an inductance approximately matching that of the transducer. In other words, a portion of circuitry used for tuning the transducer for transmitting can be nullified by matching an inductive element in the second circuit with a portion of the first circuit.

The second circuit optionally includes at least a portion of the first circuit or can be coupled to the first circuit. For example, certain components such as a switch can be disposed for coupling a transmitter to the first circuit and transducer. Another switch can be positioned to couple at least a portion of the first circuit with the second circuit. Accordingly, the second circuit can be coupled to a portion of the first circuit for receiving a wireless signal over the transducer.

To support increased magnetic coupling efficiency, the first circuit can be used to serially tune the transducer for transmitting and the second circuit can be used to parallel tune the transducer for receiving. As previously discussed, the transducer generally is tuned to effectively have a high impedance for receiving and a low impedance for transmitting.

Another aspect of the present invention is directed towards a method and apparatus for supporting communication via magnetic coupling. Generally, the method involves switching to select either transmitting or receiving over a transducer. A first circuit effectively tunes the transducer to a low impedance device for generating a magnetic field when a transmitter is switched to transmit over the transducer. A second circuit effectively tunes the transducer be a high impedance for receiving a magnetic field when a receiver is switched to receive over the transducer. Thus, a common transducer device can be tuned to transmit or receive a magnetic field depending on whether the transducer is tuned to be a high or low impedance device. The ability to select either transmitting or receiving over a single transducer is particularly advantageous in space restricted applications because at least one otherwise necessary transducer can be eliminated.

While in a transmit mode, the transducer can be serially tuned by reducing an overall reactance or impedance of the first circuit including the transducer. This can be achieved by substantially matching an inductance of the transducer with a capacitance of the first circuit so that the corresponding reactance of each component cancels or nullifies each other. Thus, a single transducer can be dynamically tuned to transmit a wireless signal.

Switching functionality can be employed to support coupling of a transmitter and first circuit to the transducer for transmitting. Likewise, switching functionality can be employed to support coupling a receiver to a second circuit and the transducer for receiving.

In a specific application, the transmitter driving the transducer and related circuit generates an output at one of two voltages. For example, the transmitter can be controlled to produce a series of high and low voltage outputs for a specified duration of time to drive the transducer. The transducer in turn will generate a corresponding magnetic field depending on the applied voltage.

A resistance can be disposed in series with the transducer to adjust a Q (quality or efficiency factor) of the circuit for transmitting and receiving over a particular resonant frequency. Adjusting the Q of the circuit has an effect on the bandwidth of data information that can be transmitted or received at a particular carrier frequency to which the transducer is tuned.

The combined impedance of the first circuit and transducer can be adjusted or tuned for generating a maximal magnetic power output of the transducer at a particular carrier frequency. For example, characteristics such as the impedance of certain components in the first circuit can be dynamically adjusted so that the transducer produces a maximal magnetic field at a particular carrier frequency. Accordingly, the battery life of a transceiver can be extended because a transducer can be adjusted for efficient use.

In certain applications, an impedance of both the first and second circuits can be adjusted for transmitting and receiving over a substantially similar carrier frequency. Thus, a single transducer can be used to transmit and receive over a common carrier frequency without interfering with other wireless devices potentially using other carrier frequencies in the wireless spectrum.

One technique for tuning the transducer involves adjusting a reactance of the first and second circuit by selectively switching capacitors in parallel to increase or decrease a capacitance of a capacitor bank. This technique of tuning can be used to select at which carrier frequency the transducer is tuned to transmit or receive.

Although the first circuit can be adjusted to tune a particular transducer, the transducer itself can be an adjustable element for tuning with a corresponding circuit. It is thus possible to adjust a combined impedance of the first circuit and transducer for transmitting or receiving via an adjustable transducer device.

One method of tuning a circuit for transmitting a maximal or increased wireless signal from the transducer involves positioning a second transducer to receive at least a portion of a magnetic signal transmitted from the first transducer. While driving a combination of the first circuit and transducer with the transmitter, a reactance of the first circuit can be adjusted to determine which setting of the first circuit produces a maximal signal at the receiving second transducer. In other words, feedback from a pickup or second transducer can be used to tune the transducer for transmitting. Likewise, the second transducer can generate a wireless signal while a receiving transducer and related circuitry is adjusted to optimally receive the generated wireless signal.

Switching techniques according to the principles of the present invention enable a single transducer to transmit and receive based on time division multiplexing. In a specific application, the transducer supports half duplex communication with a remote receiver. That is, the transducer can transmit to a remote transceiver during specified intervals and receive from the remote transceiver during other time intervals.

In yet another more specific application, a transmitter can be decoupled from the first circuit and transducer while at least a portion of the first circuit and transducer are coupled to the second circuit. A reactance of one or multiple components in the first circuit and a reactance of one or multiple components in the second circuit can be positioned to substantially cancel each other. For example, an inductor in the second circuit can be matched with the inductance of the transducer or a capacitance of the first circuit to reduce a combined impedance or reactance of both circuits to tune the transducer for receiving.

An electronic switch circuit can enable coupling and decoupling of the transmitter from the first circuit and transducer. When decoupled, the transmitter generally does not negatively affect the functionality of the transducer when set to a receiving mode since it is disconnected via an open switch.

Instead of a single transducer, multiple transducers can be utilized for transmitting and receiving. Each of the multiple transducers can be uniquely oriented so that a generated magnetic field can be coupled with a remote transceiver having an unknown orientation.

In one application incorporating multiple transducers, the first and second circuits are switched to receive over one of the multiple transducers. Alternatively, each transducer can have its own dedicated first and second circuits for tuning the corresponding transducer for transmitting and receiving. More specifically, dedicated circuitry coupled to a corresponding transducer can be adjusted for transmitting or receiving at a particular carrier frequency as previously discussed for a single transducer application.

To increase wireless coupling with a remote transceiver, the multiple transducers can be positioned so they are uniquely oriented with respect to each other. For example, three transducers can be positioned substantially orthogonal to each other. Consequently, at least one of the transducers typically can be used to communicate with a remote target transceiver regardless of its orientation with respect to the multiple transducers.

In yet another application including multiple transducers, the first and second circuits can be switched for transmitting on one of the transducers while receiving on another transducer. If no signal is received from a remote transceiver device on a selected one of the multiple transducers, another transducer can be selected to receive a magnetic signal. The unique orientation of the multiple transducers ensures that a magnetic signal can be received from at least one of the transducers at all times.

When the multiple transducers are positioned near each other, circuitry for tuning a particular transducer can be adjusted while one transducer is transmitting and one transducer is receiving. For example, a selected transducer in a group of multiple transducers can be tuned for transmitting a signal while another transducer in the group and related circuitry can be selected to receive the transmitted signal. During reception, characteristics of the transmitting transducer and related circuit can be adjusted so that an increased signal is received at the receiver. Similarly, the transducer and related circuitry selected to receive the signal can be adjusted for optimal reception while transmitting on a different transducer. Generally, the intensity of a received signal can be monitored to tune a circuit for optimally receiving or transmitting over a transducer.

Another aspect of the present invention is also directed towards an apparatus and method for supporting communication via inductive coupling. Generally, one of multiple circuit paths can be selected for either transmitting or receiving over a transducer. An overall impedance of a first circuit path including the transducer can be reduced for transmitting an inductive signal over the transducer. An overall impedance of at least a portion of a second path can be reduced for receiving an inductive signal over the transducer. Thus, a single transducer can be used to transmit or receive depending on which of multiple circuit paths is switched for transmitting or receiving.

More specifically, when the transmitter is switched to transmit over the transducer via the first circuit path, an overall impedance of the first circuit path including the transducer can be reduced by substantially matching a reactance of the transducer with circuit components disposed along the first path. For example, an inductance of the transducer can be cancelled via a capacitance switched into the first circuit path. Thus, the first circuit can have an impedance that is almost entirely real, i.e., there is little or no reactance in the first circuit path. Accordingly, the transducer can be tuned for efficiently generating a wireless signal such a magnetic field for inductive communications.

Circuit components for adjusting an impedance of a circuit path can include passive elements such as resistors, inductors and capacitors.

The second circuit path can be coupled to the first circuit path via a serially disposed switch. Consequently, the second circuit path can effectively include the first circuit path for receiving over the transducer. During reception, a transmitter is optionally decoupled from the first circuit path so that it has a minimal effect on characteristics of the second circuit path.

The second circuit path also can be coupled to a receiver for receiving over the transducer, while at least a portion of a reactance along the second circuit path is reduced by substantially matching a reactance of the transducer with at least one circuit component disposed along the second circuit path. For example, the second circuit path can include a serially disposed inductive element matched with the transducer for reducing a reactance along the second circuit path. Thus, a signal received at the transducer can be coupled more effectively to an input of the receiver. In a specific application, an inductance of the serially disposed inductive element substantially matches an inductance of the transducer.

Further, a reactance of components disposed along the second circuit path can be matched to cancel a reactance of at least a portion of a reactance of components along the first circuit path so that a reactance of at least a portion of the overall circuit path is reduced. Accordingly, a transducer can be coupled to a receiver input via a circuit path that is less susceptible to noise.

Prior to transmitting, a combined reactance along the first circuit path including the transducer can be tuned to increase a magnetic power output of the transducer at a particular carrier frequency.

Another aspect of the present invention concerns tuning a transducer for increased reception or transmission. For example, a second transducer can be positioned to receive a portion of the magnetic signal transmitted from a first transducer. While driving the first transducer via a connection through the first circuit path, an impedance along the first circuit path can be adjusted so that an increased signal is received at the second transducer. Alternatively, an impedance along the second circuit path can be adjusted for increased reception of a magnetic signal. For example, a transducer can be coupled to receive over the second circuit path while a signal is received from a second transducer. During reception, the transducer and related circuitry along the second circuit can be tuned for increased reception of the received signal. Accordingly, a single transducer can be tuned for optimally receiving or transmitting.

One of multiple transducers can be selected and an impedance along a corresponding circuit path can be adjusted to respectively transmit or receive. In one application, the multiple transducers are orthogonally disposed with respect to each other.

Another aspect of the present invention involves tuning the transducer with a capacitance in parallel with the transducer. For example, a capacitance can be disposed along a circuit path in parallel with the transducer for efficient tuning.

The previously discussed aspects of the present invention have advantages over the prior art. For example, one application of the present invention involves utilizing a relatively small transducer or multiple transducers for transmitting and receiving wireless information. In this instance, a hands-free headset or transceiver device supporting transmitting and receiving wireless audio data information can include minimal components such as a speaker, microphone, battery pack, processor circuitry and a transducer device. The size and weight of the transducer device for transmitting and receiving wireless signals can be significantly reduced because a single transducer (potentially one of multiple selectively activated transducers) can be tuned for both transmitting and receiving. Thus, the overall size and weight of the transducer system can be reduced so that a hands-free headset can be more comfortably worn by a user.

In one application, a hands-free headset is so small that it is easily clipped or secured to an ear. In such an application, size and weight of the transceiver more significantly affects whether the headset device can be comfortably worn by a user.

Based on other principles of the present invention, a transducer device can be dynamically adjusted for transmitting and receiving over an optimal carrier frequency. For instance, one or multiple transceiver devices can be dynamically adjusted in the field to optimize use of an available wireless spectrum. Interference can be reduced among multiple transceivers in the same general vicinity by dynamically tuning corresponding transducers for receiving and transmitting over different carrier frequencies. Dynamic tuning of a transducer device typically can be achieved in a relatively short period of time when electronic switches are provided to adjust corresponding circuitry coupled with respective transducers.

Previously, a single transducer was typically employed to transmit a wireless signal while another transducer was employed to receive a wireless signal at a fixed frequency. As mentioned, employing individual transducers in this manner to transmit and receive can be costly in terms of size and weight.

Dynamic tuning of one or multiple transducer devices according to the principles of the present invention has other benefits. For example, a transducer device can be optimally tuned in the field for transmitting and receiving at a particular carrier frequency and bandwidth. When properly tuned, a wireless link is generally more reliable. That is, attempted data transmissions are more likely to be received at a target device. In a bi-directional audio communication device, it is therefore less likely that a user will have to repeat a verbal message due to lost data.

Yet another benefit of the present invention relates to battery life. Dynamic tuning of a transducer device in a particular environment can ensure that a significant portion of energy dissipated by the transducer and related circuit is directed towards generating a wireless signal such as a magnetic field rather than being needlessly dissipated by related circuitry. In other words, the energy expended per bit of data transmitted to a target device can be optimized or minimized for a particular application. As a result, the effective energy spent for transmitting a wireless signal can be minimized and a corresponding battery powering the transceiver device typically can last longer. This is especially advantageous in applications in which the transceiver device is powered by coin-sized batteries and must transmit significant amounts of data to a remote target transceiver device.

According to other aspects of the present invention, electronic circuitry can be shared among multiple transducer devices for transmitting and receiving wireless data signals. For example, an electronic circuit for transmitting and receiving can be switched among multiple transducers, each of which has unique electronic characteristics that effect tuning. A dynamically tuned circuit can provide a range of tuning capability so that each of multiple unique transducers can be optimally tuned for transmitting or receiving. Thus, component variations in the transducer devices can be dynamically compensated in the field on short order.

In one application, a transducer device is tuned based upon feedback by a receiving transducer. More specifically, a transducer in the transceiver device can generate a wireless signal while another transducer in the same transceiver device can monitor the generated signal. Accordingly, a transducer can be dynamically tuned in the field for receiving or transmitting based on feedback from another transducer located within the same transceiver device. Again, energy is not needlessly wasted while generating a wireless signal to a remote target device.

Characteristics of electronic components can decay over time. Since such components are typically selected to tune a transducer device for transmitting or receiving, a carrier frequency over which a transceiver device is set to transceive, e.g., transmit or receive, can vary as a result of a component's changing electronic characteristics. For example, a capacitance of an electronic component for tuning a transducer to a specific carrier frequency can change under certain environmental conditions such as extreme temperature or humidity. This can result in a shift in a resonant frequency and less efficient coupling between two transceiver devices. According to the principles of the present invention, a transducer device can be dynamically tuned to compensate for aging, temperature or other environmental conditions for optimally transmitting or receiving a wireless signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
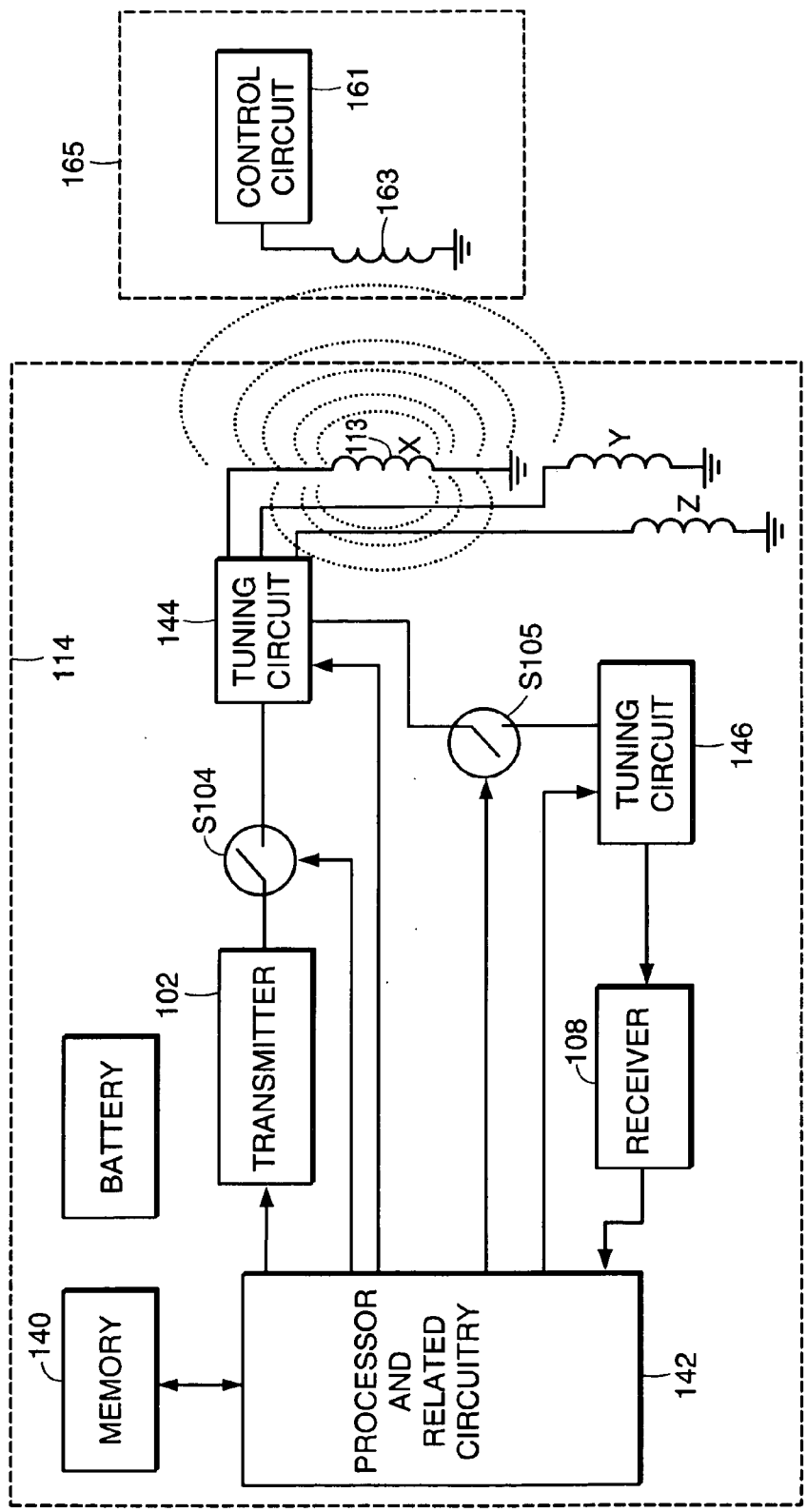
FIG. 1 is a block diagram illustrating a transceiver system according to certain principles of the present invention.

FIG. 1 is a block diagram illustrating a transceiver system according to certain principles of the present invention. As shown, a first transceiver 114 is coupled via an inductive or magnetic field to second transceiver 165. First transceiver 114 is optionally portable so that its orientation is not fixed with respect to second transceiver 165, which includes control circuit 161 and transducer 163. Second transceiver 165 itself can be portable while first transceiver is a fixed. Further, first transceiver 114 and second transceiver 165 both can be portable so that they are mobile and oriented in any manner with respect to each other.

Additional details of transceiver devices and methods of communicating are discussed in pending U.S. application Ser. No. 09/053,107 filed on Apr. 1, 1998, the entire teachings of which are incorporated herein by this reference.

Generally, tuning circuit 144 and related circuitry is controlled by processor 142 to transmit over transducer 113 while tuning circuit 146 is controlled by processor 142 to receive over transducer 113. Tuning information can be stored in memory 140 and retrieved by processor 142 for setting corresponding circuitry.

More specific details of transceiving (transmitting and/or receiving) wireless signals according to the principles of the present invention are discussed relative to the following figures.

Figure 2:
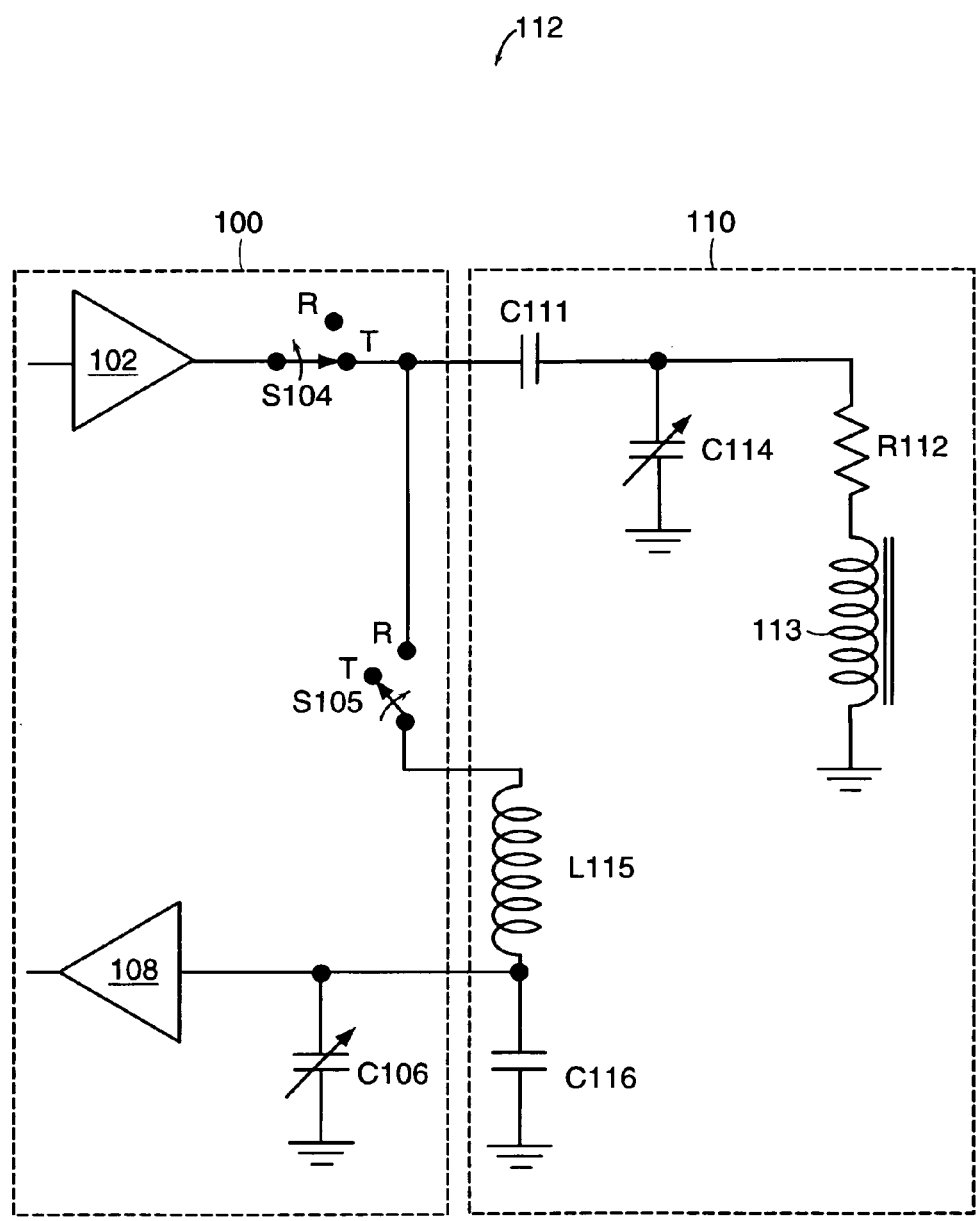
FIG. 2 is a block diagram of a transducer and related circuitry for transmitting and receiving according to certain principles of the present invention.

FIG. 2 is a block diagram illustrating a transducer for transmitting and receiving wireless signals according to certain principles of the present invention. As shown, a single transducer 113 can be employed to receive and transmit time-multiplexed wireless signals such as encoded magnetic fields.

One aspect of the present invention involves transmitting and receiving a wireless signal such as a magnetic field over transducer 113. In a specific embodiment, a single transducer 113 can be tuned via impedance network 110 for transmitting and receiving at different times. For example, transducer 113 can be tuned to receive for a specified duration of time, while at other times, transducer 113 can be tuned to transmit for a duration of time. Accordingly, a single transducer can support bi-directional communications with one or multiple remote transceivers. The use of a single transducer supporting bi-directional communications can be particularly advantageous in space restricted applications.

As previously discussed, transducer 113 can be an inductive device for generating a wireless signal such as a magnetic field. In such an application, transducer 113 can be a coiled strand of wire. A magnetic field can be generated when a current is driven through the coiled wire. A ferrite rod can be disposed at a core of the coiled strand of wire to enhance directional or signal strength characteristics of transducer 113 for receiving and transmitting a magnetic field. In a specific application, transducer 113 includes a 3×25 mm (millimeters) ferrite rod having eight turns of wire. However, specific attributes of transducer 113 can vary depending on a particular application.

As shown, network 110 includes capacitor C111, resistor R112, transducer 113, capacitor C114, inductor L115, and capacitor C116. Although FIG. 1 illustrates a specific network configuration including multiple electronic circuit elements for tuning transducer 113, network 110 can be modified while still achieving the principles of the present invention.

In other words, functional aspects of the circuit as shown in FIGS. 1 and 2 can be achieved using other circuit configurations. For example, capacitors C106 and C116 can be combined into one capacitor.

In practice, resistor R112 is a model for the parasitic resistance of transducer 113. The value of R112 can be dynamically controlled to change the operating efficiency, Q. For example, R112 can be adjusted to change an effective bandwidth at which a tuned transducer transmits or receives a wireless signal. This can be achieved by switching additional resistors in parallel with R112.

Consequently, a transducer device can be tuned in two ways. First, a transducer can be tuned to transmit or receive over a wider or narrower bandwidth centered around a resonant frequency. Also, a transducer can be dynamically tuned to efficiently transmit or receive at a selected resonant frequency.

In one application, a transducer is tuned to receive over a wide bandwidth while it is otherwise tuned to transmit over a narrower bandwidth. Such a transducer receiving over a wider bandwidth can potentially receive wireless signals from multiple transceiver devices transmitting at different resonant frequencies without having to re-tune the transducer to each of the different resonant frequencies.

Transceiver 100 typically includes circuitry for transmitting and receiving over transducer 113. For example, transceiver 100 can include transmitter amplifier 102, switch S104, switch S105, capacitor C106, and receiver amplifier 108. In a transmit mode, switch S104 and switch S105 are both switched to the 'T' position and transmitter 102 drives transducer 113 and related circuitry as shown in FIG. 1. Receiver circuit including L115, C116, C106, and receiver amplifier 108 are generally disconnected (via open switch S105) from transmitter circuit including amplifier 102, S104, C111, C114, R112 and transducer 113 while in a transmit mode.

Switches S104 and S105 can be electronically controlled BJT (Bipolar Junction Transistor) or FET (Field Effect Transistor) devices. When such devices are used, fast switching times can be achieved and transducer 113 can be quickly tuned to either transmit or receive. Consequently, a half duplex system including transducer 113 can be switched so fast that the system of the present invention appears to support full-duplex communications.

Other types of switches including mechanical devices such as relays, solenoids, and the like also can be used to switch between transmitting and receiving according to the principles of the present invention.

As shown in FIG. 2, switches S104 and S105 are switched to the 'T' position for transmitting. In a receive mode, S104 and S105 are both generally switched to position 'R' and receiver 108 receives a signal sensed by transducer 113. Typically, switches S104 and S105 are driven by another electronic device controlled by, for example, a microprocessor that selects either transmitting or receiving.

Receiver 108 can be an amplifier device that senses a relatively small AC (Alternating Current) signal and amplifies it for further processing. For example, an amplitude varying voltage as sensed by transducer 113 can be amplified so that data such as digital information modulated onto a selected carrier frequency can be further processed by a microprocessor device. Receiver 108 can therefore be an amplifier device.

As discussed, one aspect of the present invention concerns tuning transducer 113 for transmitting and receiving at different intervals of time. In a transmit mode, a series LC circuit can be tuned to a selected carrier frequency so that the impedance of transducer 113 is effectively reduced. More specifically, an overall reactance (as seen by transmitter 102) of combined circuitry C111, C114, R112, and transducer 113 can be effectively reduced so that a majority of energy is coupled to transducer 113 to generate a magnetic field. A portion of total energy will be dissipated by series resistor R112. However, the energy dissipated by R112 is typically minimal and depends on the efficiency, Q, of the circuit.

Since a portion of the transmitter circuitry, i.e., capacitor C111, is in series with transducer 113, its effects must be addressed while in the receive mode. For example, the capacitive effects of C111 can be nullified by inductive effects of inductor L115 when switches S104 and S105 are switched to receive mode.

During reception, a parallel LC circuit including transducer 113 generally can be tuned for optimal reception of a wireless signal such as a magnetic field. For example, receiver circuitry can be tuned to increase an effective impedance of transducer 113 so that a relatively large voltage develops at amplifier 108 as a result of a received wireless signal. A voltage generated by transducer 113 during reception can be coupled to input of receiver amplifier 108, where the received signal is further amplified and digitally processed.

In one application, an impedance such as a reactance along a receiver circuit path including C111, S105 and L115 between transducer 113 and receiver 108 is reduced for better signal reception, i.e., the circuit can be tuned to achieve a higher signal-to-noise ratio at receiver amplifier 108. For example, inductor L115 can be impedance matched to capacitor C111 so that capacitors C116, C114, C106, and serial combination of R112 and transducer 113 form a parallel tunable LC tank circuit. A substantial reactance of C111 and L115 can cancel each other while switched to a receive mode. As a result, C114 can be effectively in parallel with C106 and C116 via a low impedance path including C111, S105 and L115.

In a transmit mode, C111 and C114 are provided to tune transducer 113. That is, a capacitance of C111 and C114 can be adjusted to cancel the inductive effects of transducer 113. A ratio of C111 to C114 is typically selected to set a peak current driving transducer 113.

Both C114 and C106 can be tunable capacitors for adjusting the resonant frequency of corresponding transmit and receive circuits. Consequently, capacitors C114 and C106 can be electrically or mechanically tuned so that the corresponding circuit resonates at a particular carrier frequency.

Transceiver device 112 can be tested at a factory to determine optimal settings for capacitors C106 and C114 for transmitting and receiving at a particular carrier frequency. Either or both capacitors C106 and C114 can be fixed to permanent values in the factory. In one application, C106 and C114 are set or adjusted to a value during an assembly and testing process of a transceiver device and switches S104 and S105 are thereafter used to select a mode of transmitting or receiving.

Alternatively, information concerning capacitor selection can be stored in memory and later retrieved to dynamically tune transducer 113 in the field depending on a particular application. More specifically, switch settings can be stored in a table and applied to select a capacitance of a particular capacitor bank to tune transducer 113 for transmitting or receiving at a particular carrier frequency. Information stored in memory can include binary data identifying which of multiple switches in a capacitor bank will be activated to select a particular capacitance of C106 or C114.

During transmission, transmitter amplifier 102 generates a voltage that couples across resistor R112 and transducer 113. In one embodiment, transmitter 102 generates an output at one of two voltages from an electronic device such as an ASIC (Application Specific Integrated Circuit). For example, transmitter 102 can be designed to drive a binary voltage output of either 0 volts or 2 volts. By varying the voltage output at transmitter 102 at different frequencies or for different durations of time, data information such as binary encoded data can be modulated onto a carrier frequency and transmitted over transducer 113. Thus, a digital integrated circuit device can be used to drive transducer 113.

As an alternative to a binary voltage output at transmitter 102, any other suitable voltage such as an analog sinusoidal voltage or other amplitude varying analog voltage can be used to effectively drive transducer 113 and related circuitry. Regardless of voltage type, a wireless signal can be generated by transducer 113 for coupling to one or multiple target devices.

In one application, transducer 113 is tuned to transmit and receive at a resonant frequency of around 12.0 MHZ. However, any other suitable resonant frequency generally can be used.

As previously discussed, capacitor C106 and C114 as well as other components shown in FIG. 2 can be adjustable to provide tuning of transducer 113 for either transmitting or receiving.

Figure 19:
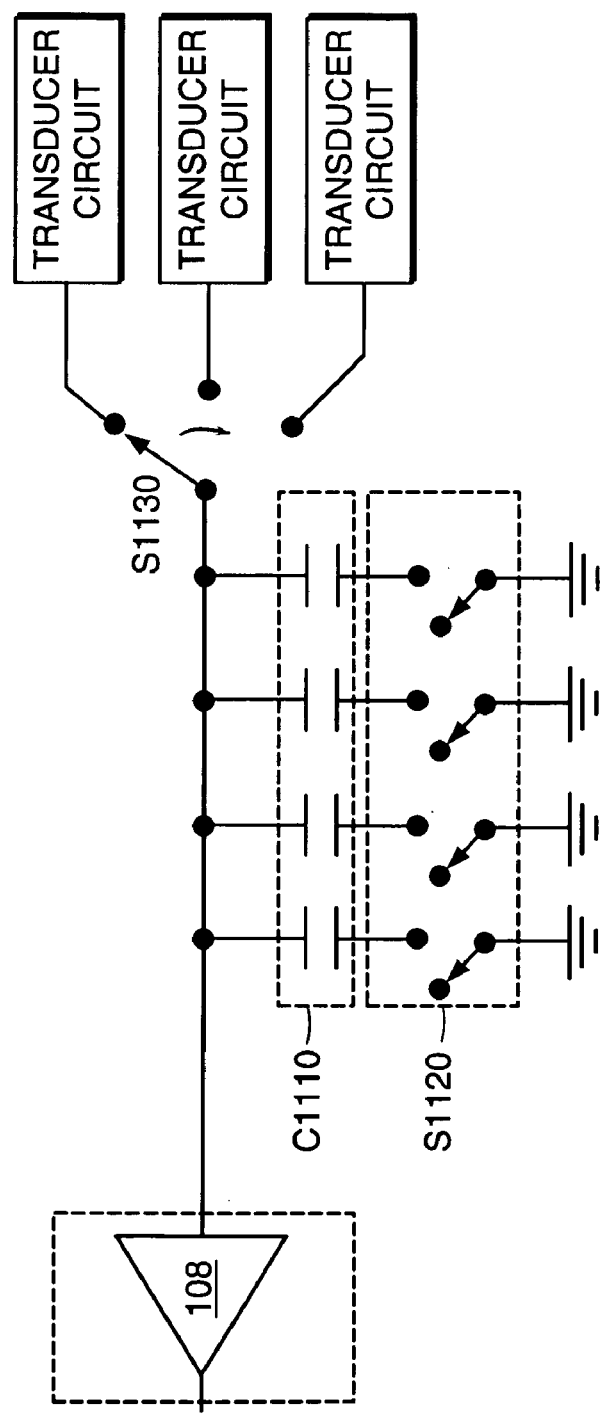
FIG. 19 is a diagram of a capacitor bank according to certain principles of the present invention.

In one embodiment, an adjustable capacitor is formed via a bank of parallel capacitors C1110 that are potentially connected to ground via corresponding switches S1120 as shown in FIG. 19. To select a particular capacitance for tuning transducer 113 for either transmitting or receiving, switches such as FET devices are activated to connect an end of a corresponding capacitor to ground. When more capacitors in capacitor bank C1110 are connected to ground via corresponding switches, S1120, an effective capacitance of the bank increases. Conversely, an overall capacitance supplied by the capacitor bank decreases as capacitors are disconnected from ground via corresponding switches. Consequently, transducer 113 can be tuned to a particular resonant frequency by adjusting a reactance of circuits via switching for transmitting or receiving. As previously discussed, switch setting information can be stored as binary data in memory.

Referring again to FIG. 2, capacitor C116 can be selected to provide a majority of capacitance provided by combination of C106, C114 and C116. Thus, one or multiple capacitors comprising C106 can be components having a smaller capacitance value to provide fine tuning of combined capacitance of C106 and C116. Likewise, C111 can be selected to provide a majority of capacitance provided by combination of C111 and C114, while C114 itself can be a capacitor bank comprising many smaller capacitors for fine tuning. Note that C114 and C111 are set to control the maximum signal strength.

Another aspect of the present invention concerns selecting of components disposed in either the transmit or receive circuit. Although any component values generally can be selected for use in transceiver device 112, component values are typically selected to provide a desired performance. In space restricted applications, an actual size of components is a factor to consider for selecting component values. Typically, capacitor values are on the order of micro-farads or picoFarads. In other applications, power dissipation and signal bandwidth are factors to consider for properly selecting component values. Thus, selection of components can differ depending on a particular application.

In a specific application, transducer 113 is selected to have a maximum number of effective ampere-turns so that a predetermined amount of power is dissipated in lumped loss element resistor R112. Typically, R112 represents a majority of losses in the transmit path. Transmitter 102 and each passive component has its own loss element but this is generally minimal.

Although 12 MHZ is a typical resonant frequency, for transmitting or receiving a selected carrier frequency can be any suitable setting such as between 0.5 and 60 MHZ.

As previously discussed, a reactance of the transmit circuitry including C111, C114, R112 and transducer 113 can be reduced so that the circuit has only real impedance components. Thus, the resonant frequency, $\omega_o$, is defined by:

$$\omega_o = \frac{1}{\sqrt{L_{113}(C111\|C114)}}$$

Given a carrier frequency generally centered around 12.0 MHZ, transducer 113 can be 1.5 µH while C111 and C114 can be respectively 33 pF (picoFarads) and 84.3 pF.

Efficiency factor, Q, of the circuit can be approximately 40 depending on components selected resulting in resistance R112, inductance of transducer 113 (noted above as $L_{113}$), and capacitor divider C111 and C114. For example, the efficiency Q can be defined as the energy stored by transducer 113 in its magnetic field divided by the energy dissipated by the overall transmitter circuit. Using RMS (Root Mean Squared) voltages and currents, the following approximate equations reflect attributes of the circuit while in a transmit mode:

$$Q = \frac{V_{113}}{V_{IN}}\left(\frac{C111 + C114}{C111}\right)$$

$$P_{R112} = (I_{113})^2 \cdot R112$$

where
$P_{R112}$=power dissipated in resistor R112
Q=efficiency or quality factor of the circuit
$V_{in}$=output voltage of transmitter 102
$V_{113}$=voltage across transducer 113
$F_o$=resonant frequency Typical values for the circuit are:
$F_o$=12 MHz
$P_{R112}$=25 mW (milliwatts)
Q=40
$L_{113}$=1.5 µpH (microhemries)
C111=33 pF (picofarad)
C114=84.3 pF (picofarad)
R112=2.8 ohms
data throughput rate=204 kilobits/second
Bandwidth around carrier frequency=300 Kilohertz
Approximate range of transceiver=1.5 meters One factor to consider when selecting a transducer 113 impedance is electric field coupling between a remote transmitter and transducer 113. For example, if the impedance of transducer 113 is too high, it produces signals as a result of electric field coupling (with remote transducers) rather than or in addition to magnetic field coupling. Typically, the inductance of transducer 113 is selected to substantially support inductive coupling. Thus, continuous coupling can be supported between transducer 113 and a remote device without nulls as sometimes experienced with RF devices.

Component values for capacitors are generally selected so they are larger than the parasitic capacitance of the circuit board and corresponding traces, including parasitic output capacitance of transmitter 102 and input capacitance of receiver 108 potentially disposed in an electronic device such as an ASIC (Application Specific Integrated Circuit).

As previously discussed, a component value of inductor L115 is selected to cancel capacitive effects of C111. When L115 is properly selected, a low impedance path is generally created so that C114, C116 and C106 are effectively in parallel with each other and transducer 113.

Figure 3:
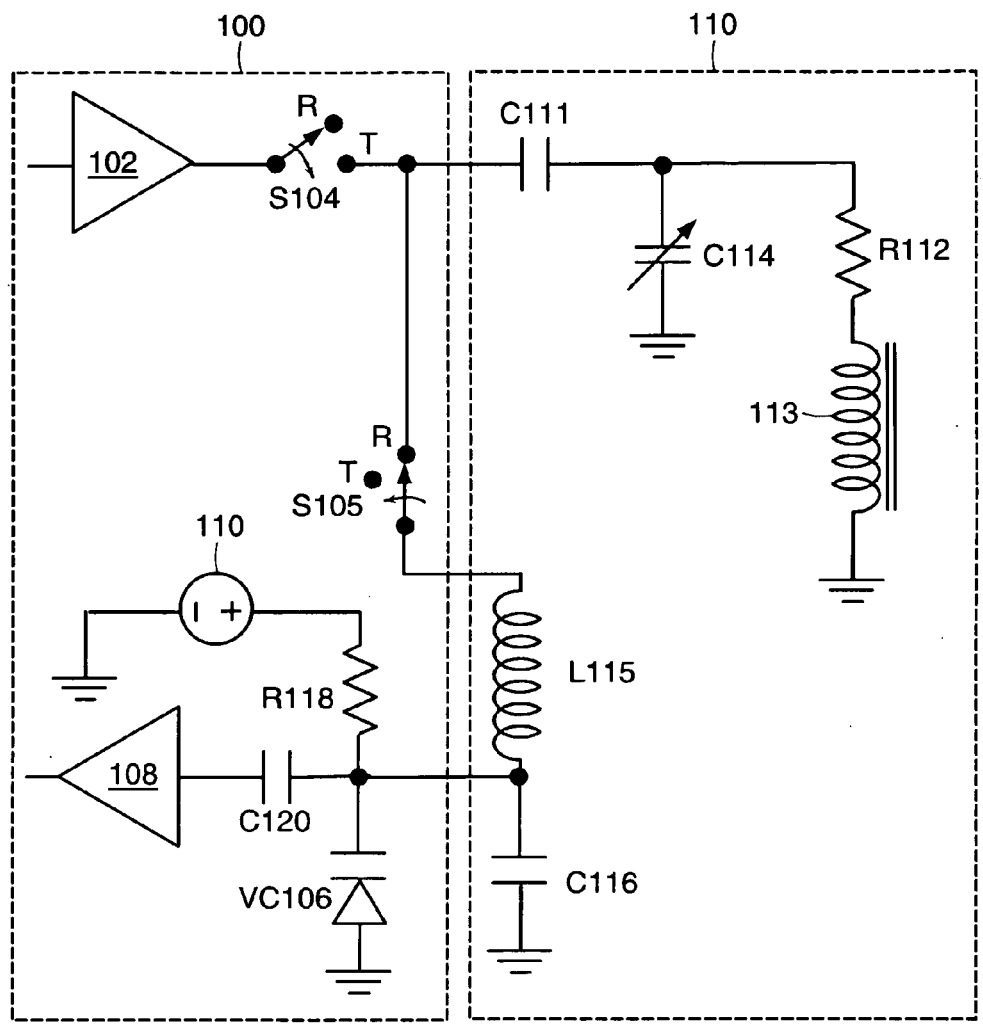
FIG. 3 is a circuit diagram including an adjustable varactor capacitor in which a transducer is tuned for receiving according to certain principles of the present invention.

FIG. 3 is a circuit diagram including an adjustable varactor capacitor in which a transducer is tuned for receiving according to certain principles of the present invention. In addition to components as shown in FIG. 2, FIG. 3 includes adjustable varactor capacitor VC106 (in lieu of C106), bias generator 110, resistor R118 and capacitor C120.

Transducer 113 can be tuned for receiving based upon adjustments to varactor capacitor VC106.

As previously discussed, receiver amplifier 108 can be coupled for receiving over transducer 113 by setting switches S105 and S104 to position 'R'. While in the receive mode, an inductance of inductor L115 approximately cancels a reactance of capacitor C111 for effectively connecting transducer 113 via a low impedance path to capacitor C116 and varactor capacitor VC106 through resistor R112. Varactor capacitor VC106, capacitor C116, capacitor C114 and transducer 113 form a parallel tunable LC tank circuit in which varactor capacitor VC106 is tuned to increase reception of a wireless signal as detected at the input of receiver amplifier 108.

Bias generator 110 generates a voltage that is applied to VC106 through resistor R118. The voltage of bias generator 110 is adjusted to select a capacitance of VC106. Consequently, transducer 113 and related circuitry can be tuned to receive a wireless signal at a particular carrier frequency.

Resistor 118 provides resistive isolation between bias generator 110 and the received signal while capacitor C120 provides DC (Direct Current) isolation between bias generator 110 and receiver amplifier 108.

Although bias generator 110 can be controlled by many types of devices, bias generator 110 is typically a voltage source controlled by a microprocessor and related circuitry to adjust characteristics of the circuit and tune transducer 113 to receive at a particular carrier frequency.

Figure 4:
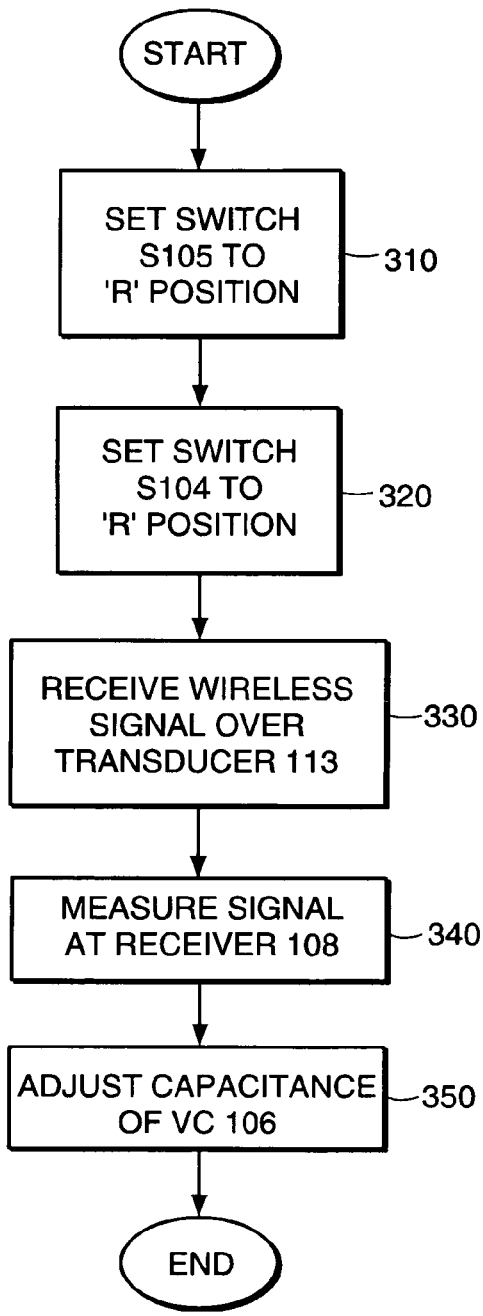
FIG. 4 is a flow chart illustrating a method for adjusting a varactor capacitor and tuning a transducer for receiving according to certain principles of the present invention.

FIG. 4 is a flow chart illustrating a method for adjusting a varactor capacitor and tuning a transducer for receiving according to certain principles of the present invention.

In step 310, transducer 113 is coupled to receiver amplifier 108 by setting switch S105 to position 'R'.

In step 320, transmitter amplifier 102 is decoupled from transducer 113 by setting switch S104 to position 'R'.

In step 330, a wireless signal is received over transducer 113.

In step 340, the signal at input or output of receiver 108 is measured.

In step 350, the capacitance of varactor capacitor VC106 is adjusted via the voltage supplied by generator 110 to increase or maximize the received signal strength at the input of receiver amplifier 108.

Generally, this same procedure can be utilized to set the transceiver device 112 in FIG. 2 for receiving. In this instance, capacitor C106 and C114 are adjusted for receiving at a particular carrier frequency.

Figure 5:
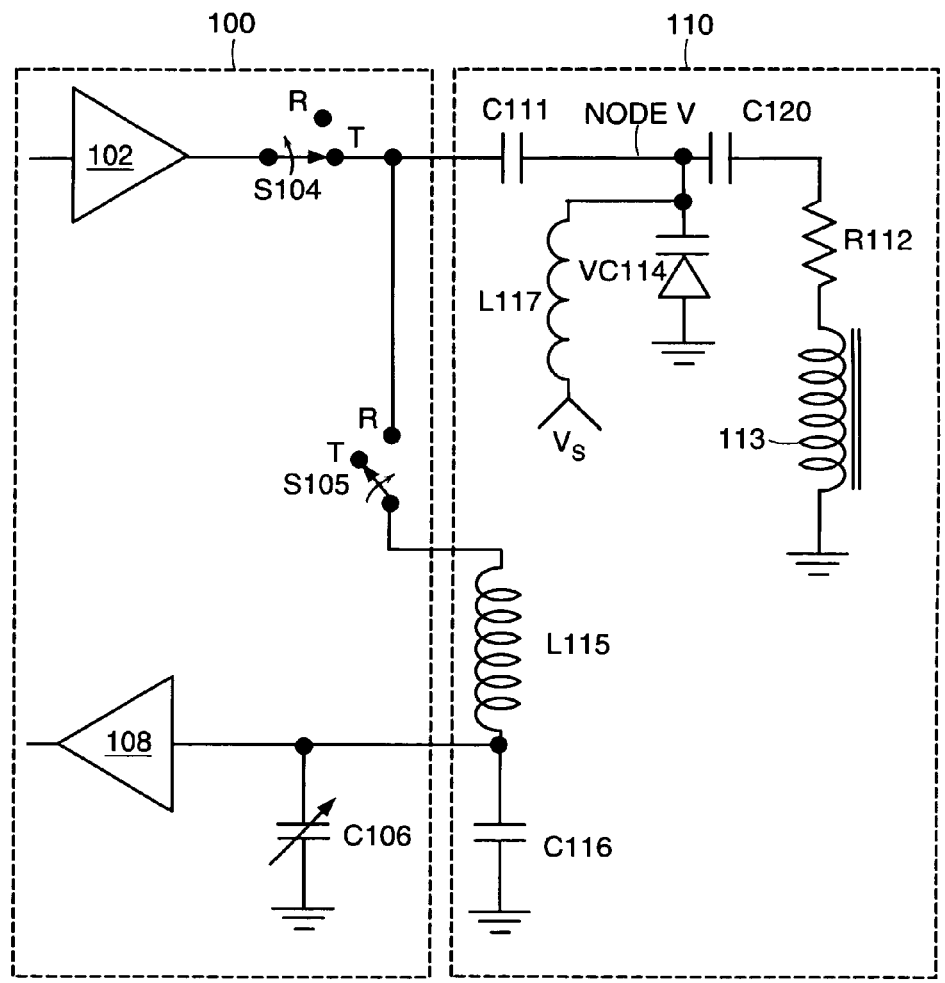
FIG. 5 is a circuit diagram including an adjustable varactor capacitor in which a transducer is tuned for transmitting according to certain principles of the present invention.

FIG. 5 is a circuit diagram including an adjustable varactor capacitor in which a transducer is tuned for transmitting according to certain principles of the present invention. Generally, the circuit in FIG. 5 is similar to that shown in FIG. 3 except varactor capacitor VC114, inductor L117, and capacitor C120 are provided to adjust characteristics of the circuit for transmitting over transducer 113.

During operation and as shown in FIG. 5, transmitter amplifier 102 is switched for transmitting over transducer 113 by setting switch S104 to position 'T' while receiver amplifier 108 is decoupled from transducer 113 and related circuitry by setting switch S105 to position 'T'.

Capacitor C111, varactor capacitor VC114 and transducer 113 generally form a tunable LC circuit while in the transmit mode. Typically, varactor capacitor VC106 is adjusted to increase or maximize a transmit signal strength as measured at a magnetic loop probe located in proximity to transducer 113.

A voltage, Vs, is applied at inductor L117 as shown to select a capacitance of VC114. This voltage can be a DC voltage supplied from any suitable electronic device or component such as a D/A (Digital-to-Analog) converter.

Although FIG. 5 illustrates a specific technique for providing a bias to node V of VC114, other similar techniques can be utilized to select an effective capacitance of VC114 for tuning the circuit.

Inductor L117 is typically provided to isolate voltage source Vs from VC114 so that a signal supplied to transducer 113 is not effected by voltage supply, Vs. Capacitor C120 is a blocking capacitor that isolates DC (Direct Current) components of the voltage generated by voltage source Vs from appearing across transducer 113.

Figure 6:
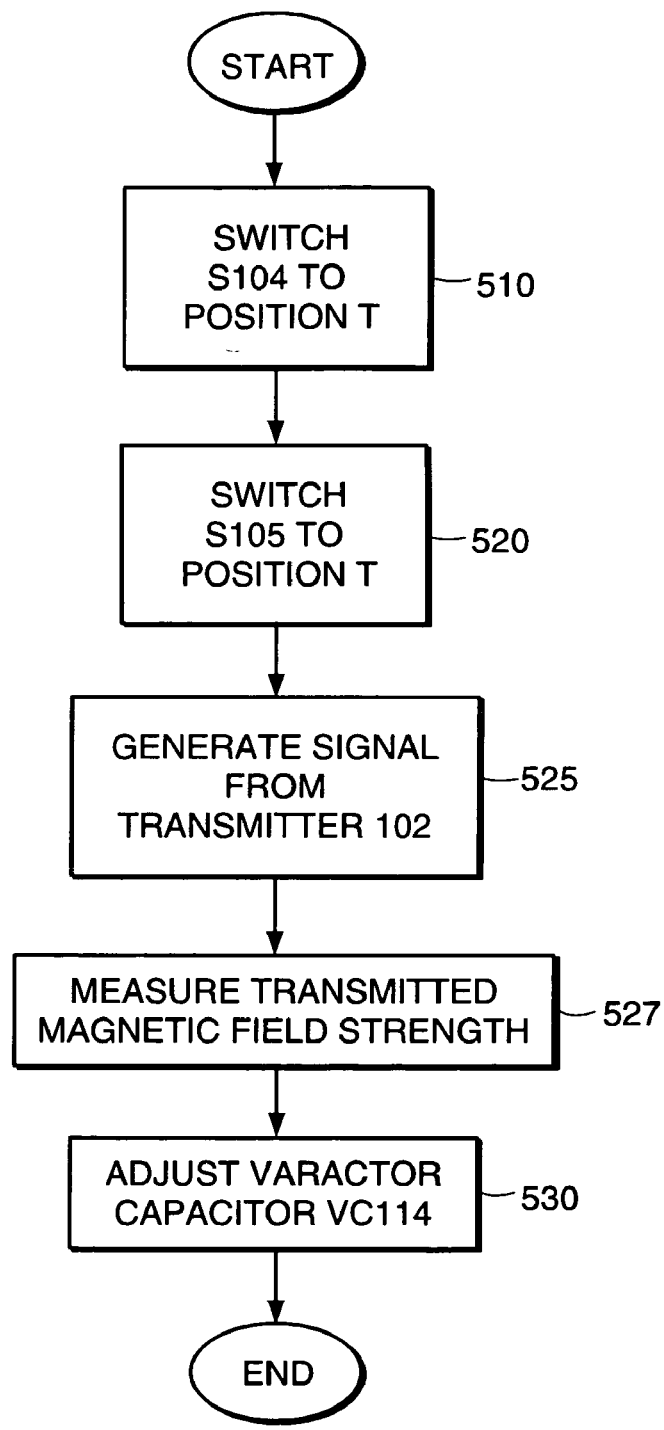
FIG. 6 is a flow chart illustrating a method for adjusting a varactor capacitor for transmitting over a transducer according to certain principles of the present invention.

FIG. 6 is a flow chart illustrating a method for adjusting a varactor capacitor for transmitting over a transducer according to certain principles of the present invention.

In step 510, transducer 113 is coupled to transmitter 102 by setting switch S104 to position 'T'.

In step 520, receiver amplifier 108 is decoupled from transducer 113 by setting switch S105 to position 'T'.

In step 525, a signal is generated at transmitter 102 to transmit a wireless signal over transducer 113.

In step 527, the generated wireless signal is measured to determine a magnetic field strength.

In step 530, the capacitance of varactor capacitor VC114 is adjusted via a voltage supplied by source Vs to increase or maximize the transmitted signal from transducer 113. A magnetic loop probe can be located in proximity to transducer 113 for monitoring a corresponding generated magnetic field. For example, a range of voltages can be applied to varactor capacitor VC114 to determine which of multiple potential settings is preferred for transmitting data information at a particular carrier frequency.

Figure 7:
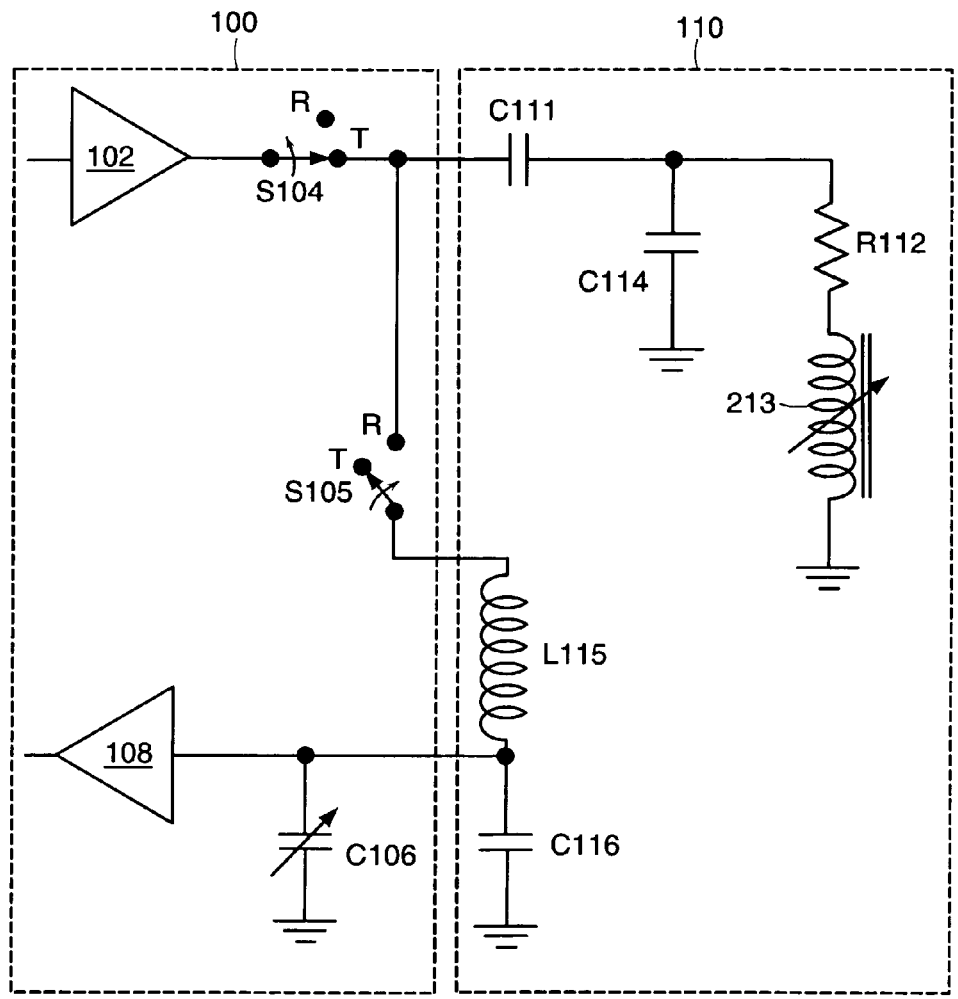
FIG. 7 is a circuit including an adjustable transducer according to certain principles of the present invention.

FIG. 7 is a circuit including an adjustable transducer device according to certain principles of the present invention. Generally, adjustable transducer 213 is tuned for transmitting at a particular carrier frequency. Capacitor C114 can be fixed instead of being adjustable as illustrated in previous figures.

To operate in a transmit mode, transmitter amplifier 102 is coupled to transducer 213 by setting switch S104 to position 'T' while receiver amplifier 108 is decoupled from variable inductor transducer 213 by setting switch S105 to position 'T'. While in this mode, capacitor C111, fixed capacitor C114 and variable inductor antenna 113 generally form a tunable LC tank circuit.

Variable inductor transducer 213 can be adjusted to maximize or increase a magnetic field generated by transducer 213. For instance, transducer 213 can be adjusted while a monitor such as a magnetic loop probe located in proximity to transducer 213 monitors a wireless signal generated by transducer 213 to determine which of multiple potential settings is optimal for transmitting over adjustable transducer 213.

Depending on the application, an inductance value of adjustable transducer 213 can be varied manually or automatically.

Figure 8:
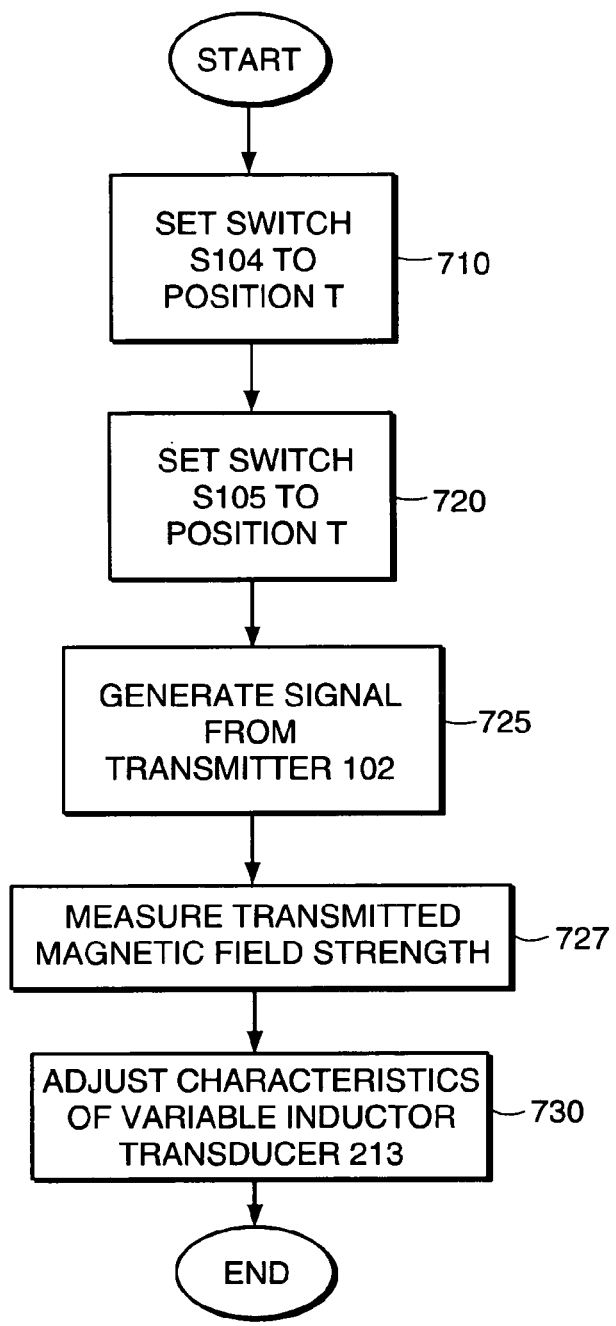
FIG. 8 is a flow chart illustrating a method for adjusting a variable inductor transducer for transmitting according to certain principles of the present invention.

FIG. 8 is a flow chart illustrating a method for adjusting a variable inductor transducer for transmitting according to certain principles of the present invention.

In step 710, transducer 213 is coupled to transmitter 102 by setting switch S104 to position 'T'.

In step 720, receiver amplifier 108 is decoupled from transducer 113 by setting switch S105 to position 'T'.

In step 725, a signal is generated at transmitter 102 to transmit a wireless signal over transducer 213.

In step 727, the generated wireless signal is measured to determine a magnetic field strength.

In step 730, the inductance of transducer 213 is adjusted to increase or maximize the wireless signal generated by transducer 213. A magnetic loop probe can be located in proximity to transducer 213 for monitoring a corresponding generated magnetic field. For example, transducer 213 can be adjusted while the magnetic field is monitored to determine which of multiple potential settings is preferred for transmitting data information at a particular carrier frequency.

Figure 9:
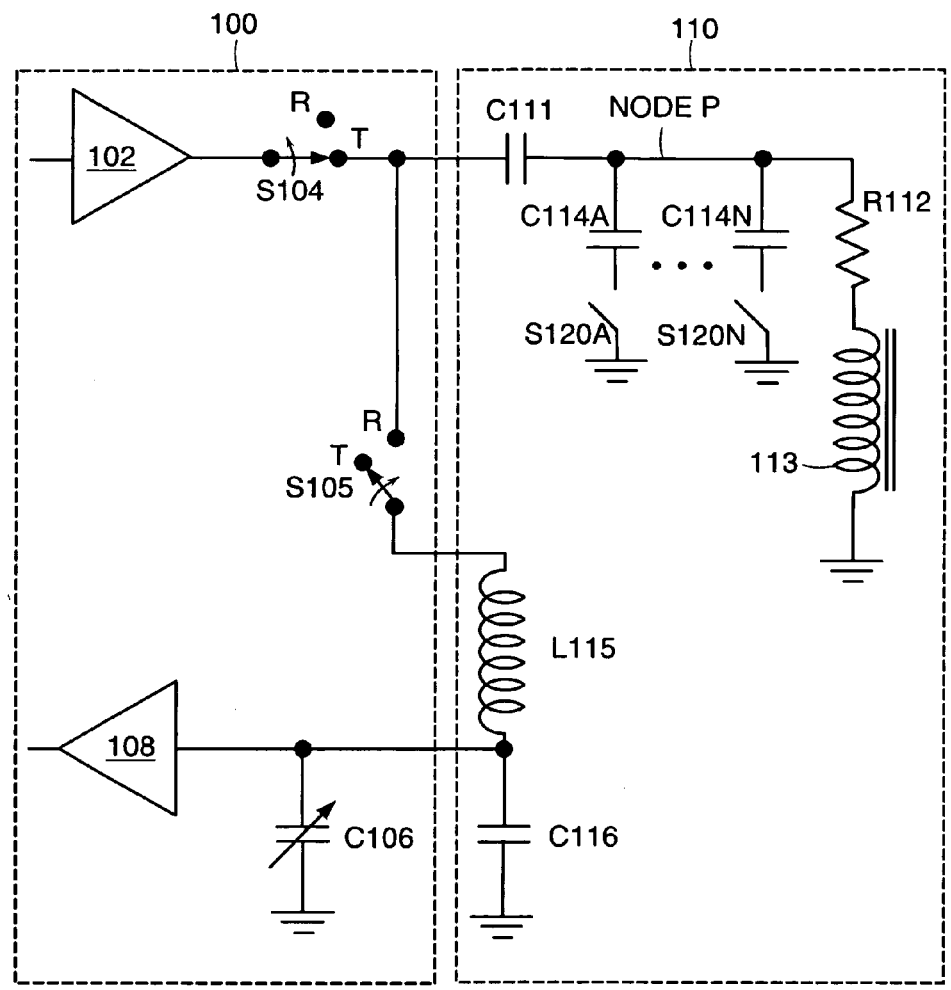
FIG. 9 is a circuit diagram including a capacitor bank for tuning a transducer device according to certain principles of the present invention.

FIG. 9 is a circuit diagram including a capacitor bank for tuning a transducer device according to certain principles of the present invention. As shown, this circuit illustrates an embodiment including capacitors C114A . . . C114N and corresponding switches S120A . . . S120N for tuning transducer 113.

To operate in a transmit mode, transmitter amplifier 102 is coupled to transducer 113 by setting switch S104 in position 'T' while receiver amplifier 108 is decoupled from transducer 113 by setting switch S105 in the 'T' position. Capacitors 114A . . . 114N form a capacitor bank and switches S120A ... S120N form a switch bank that connect corresponding capacitors C114 to ground.

When a switch S120 is closed, i.e., a low impedance path is provided between a corresponding capacitor and ground. An effective capacitance of the capacitor is then imparted at node P to increase the overall capacitance at node P. Conversely, when a switch S120 is open, i.e., a high impedance path is provided between a corresponding capacitor and ground, a corresponding capacitor C114 is effectively removed from the circuit so that this extra capacitance is no longer imparted at node P.

In one embodiment, switches S120 are FET (Field Effect Transistor) or BJT (Bipolar Junction Transistor) transistor devices controlled by a microprocessor device. However, any type of mechanical or electronic switch can be used.

Capacitor C111, selected capacitors C114 (those coupled to ground via switches S120) and transducer 113 form a tunable LC tank circuit. Capacitors C114A ... C114N are switched into and out of the circuit to maximize or increase a magnetic signal generated by transducer 113. For example, capacitor bank C114A ... C114N can be adjusted while a monitor such as a magnetic loop probe located in proximity to transducer 113 monitors a signal generated by transducer 113 to determine which of multiple potential settings is optimal for transmitting.

Figure 10:
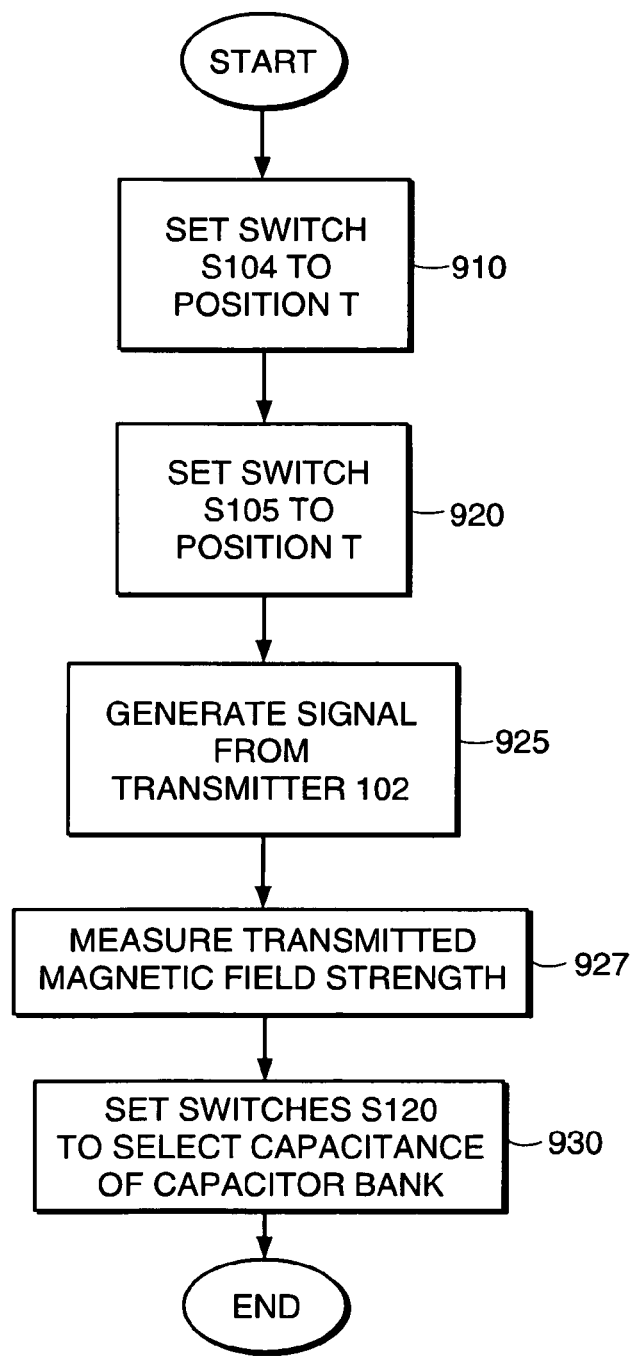
FIG. 10 is a flow chart illustrating a method for adjusting a capacitance provided by a capacitor bank that tunes a transducer for transmitting according to certain principles of the present invention.

FIG. 10 is a flow chart illustrating a method for adjusting a capacitance provided by a capacitor bank that tunes a transducer for transmitting according to certain principles of the present invention.

In step 910, transducer 113 is coupled to transmitter 102 by setting switch S104 to position 'T'.

In step 920, receiver amplifier 108 is decoupled from transducer 113 by setting switch S105 to position 'T'.

In step 925, a signal is generated at transmitter 102 to transmit a wireless signal over transducer 113.

In step 927, the generated wireless signal is measured to determine a magnetic field strength.

In step 930, the capacitance provided by capacitor bank C114 is adjusted via switches S120 to increase, maximize or optimize a magnetic signal transmitted from transducer 113 for a particular application. A magnetic loop probe can be located in proximity to transducer 113 for monitoring a corresponding generated magnetic field. For example, a capacitance at node P can be adjusted while a magnetic field generated by transducer 113 is monitored. Consequently, settings for the circuit in FIG. 8 can be optimized for transmitting data information at a particular carrier frequency. These settings as discussed can be learned and then stored in memory.

Figure 11:
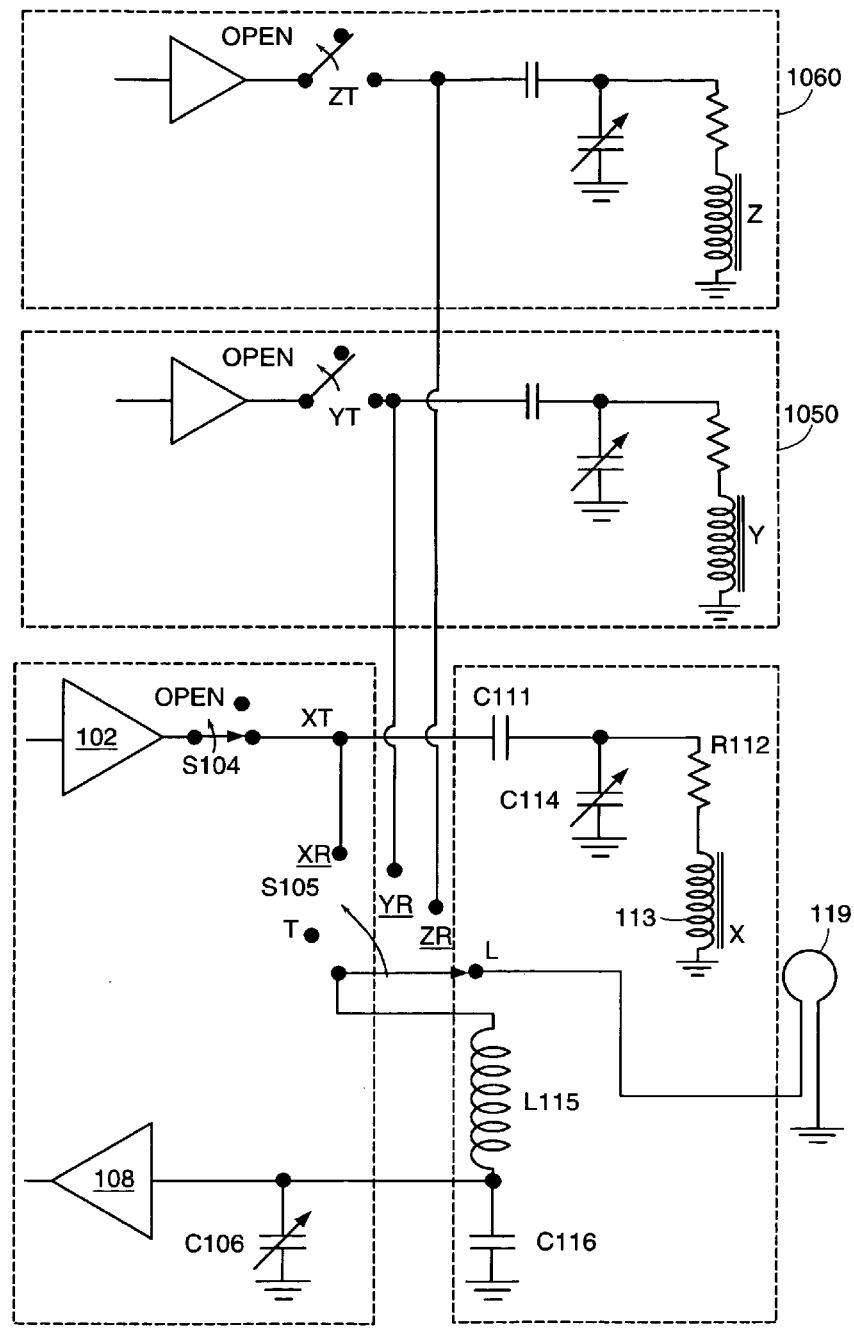
FIG. 11 is a circuit diagram including a first transducer for transmitting a wireless signal and second transducer for receiving a wireless signal according to certain principles of the present invention.

FIG. 11 is a circuit diagram including transducers for transmitting a wireless signal and a transducer for receiving a wireless signal according to certain principles of the present invention. Although switch S105 can include multiple positions for coupling receiver 108 to either transducer X, transducer Y, transducer Z or loop 119 for receiving, receiver circuitry including S105, L115, C116, C106 and receiver 108 can be duplicated for each of the transducers or wire loop 119 so that a magnetic signal can be received over a single selected transducer or multiple transducers simultaneously.

As shown, second transducer 119 can be positioned for receiving a wireless signal transmitted over transducer X, Y or Z, all of which are disposed in a single transceiver device. In one application, transducer 119 is a wire loop antenna that enables self-tuning of a selected transducer based upon feedback. For example, transducer 113 can be tuned to transmit a wireless signal based on signal strength of the wireless signal as received at second transducer 119.

Typically, transducer 119 or transducer 113 is fabricated from wire loops, coiled wires, wires, circuit board traces, discreet components, hybrid integrated circuit packages or monolithically integrated portions of integrated circuits. Any suitable transducer device can be employed for transmitting and receiving according to the principles of the present invention.

Generally, the circuit as shown in FIG. 11 operates based upon the principles as previously discussed. However, switch S105 can include switch position settings XR, YR, and ZR as shown for respectively coupling a respective transducer X (transducer 113), Y or Z and related circuitry to an input of receiver 108. Circuit 1050 and circuit 1060 respectively include transducer Y and transducer Z and related circuitry that can be coupled to receiver 108. Note that each transducer can be driven by a corresponding transmitter device as shown. Alternatively, switch S104 can be modified to include multiple switch positions so that transmitter 102 can drive a selected transducer.

Switch position 'L' of switch S105 renders it possible to couple transducer 119 to the input of receiver 108. Thus, a magnetic signal as transmitted by transducer X, Y or Z can be monitored based on the wireless signal as received at transducer 119.

Feedback provided by transducer 119 can be used to tune transducer 113. For example, capacitor C114 can be adjusted so that a maximal or increased magnetic field is generated by transducer 113 based on feedback from transducer 119.

Depending on characteristics or type of transducer 119, the circuit as shown can be modified for properly receiving a corresponding wireless signal at receiver 108.

As discussed, circuit 1050 and circuit 1060 each can include a transducer similar to transducer 113 and corresponding circuitry for tuning. For example, circuit 1050 and circuit 1060 each can include a transducer device similar to transducer 113. Also, each circuit 1050 and circuit 1060 can include corresponding components such as R112, C114, and C111, similar to the circuitry shown for transducer 113.

Based upon switching of switch S105, a corresponding transducer can be coupled via circuit path including L115, C116 and C106 to the input of receiver 108. Capacitor C106 can be adjusted for tuning a transducer for receiving a wireless signal. Thus, a single receiver 108 and related circuitry can be adjusted or tuned to receive a wireless signal over a selected one of multiple transducers. Also, transducer X, Y or Z can be adjusted for transmitting a corresponding wireless signal. In one application, transducers X, Y and Z are uniquely positioned so that they are orthogonal to each other.

Transmitter amplifier 102 can be coupled to transducer 113 by setting switch S104 to position 'T' while transmitter amplifiers in circuits 1050 and 1060 are decoupled from their associated transducer Y and Z by setting their corresponding switches to an open position.

Receiver 108 is coupled to transducer 119 by setting switch S105 to position 'L'. However, after an optimal setting is identified for transmitting over a particular transducer, switch S105 can be switched to receive on one of the other transducers. Thus, receiver 108 also can be switched to receive a wireless signal from a remotely located source.

A combination of capacitor C111, capacitor C114 and transducer 113 form a tunable LC circuit, in which capacitor C114 is tuned to maximize or increase the magnetic signal strength as generated by transducer 113. Transducer 119 is typically positioned in reasonable proximity such as within centimeters or millimeters of transducer 113 for receiving the corresponding wireless signal generated by transducer 113. The strength of the received wireless signal can be measured at the output of receiver amplifier 108. This feedback process also can be used to tune transducer Y or transducer Z when switches are set to YT or ZT respectively.

In one embodiment, each transducer device is uniquely positioned with respect to each other. For example, three transducers such as transducers X, Y, and Z can be orthogonally disposed to each other along an X, Y and Z axis for transmitting and receiving one or multiple wireless signals. Based upon this configuration, a continuous wireless link can be supported with a remote target device such as that shown in FIG. 1, even though an orientation of transducers changes as a result of motion.

Figure 12:
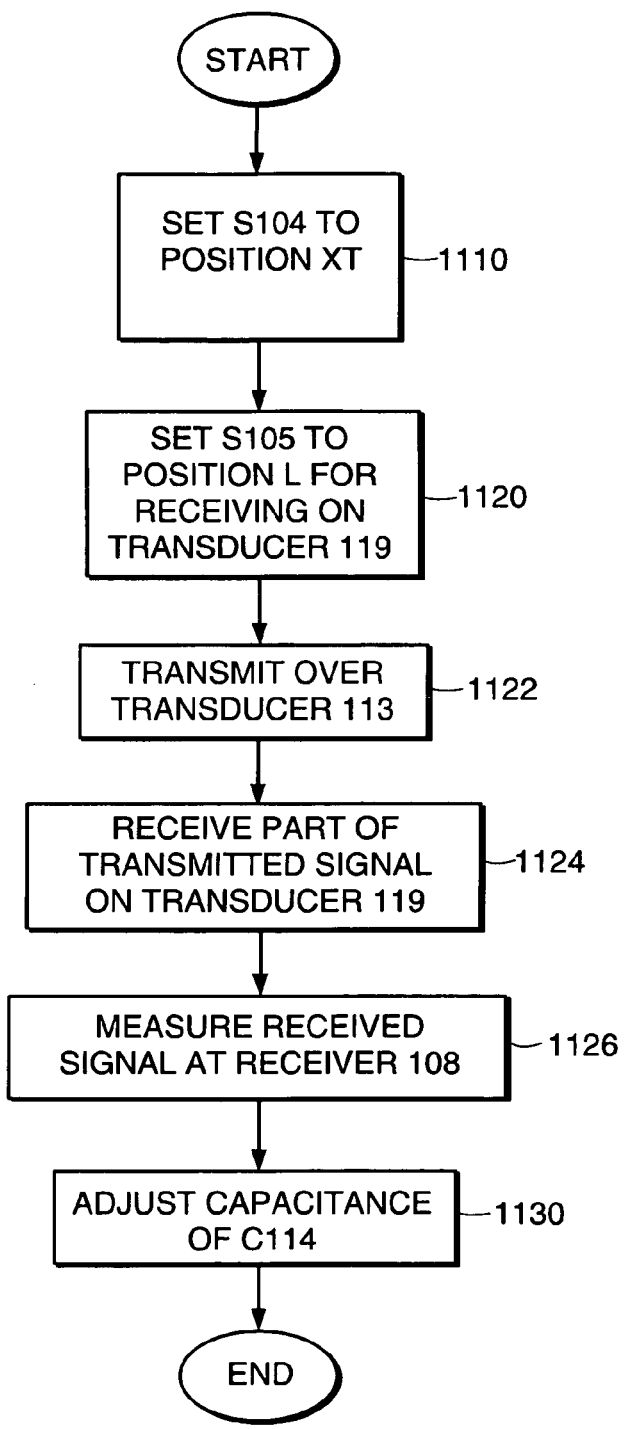
FIG. 12 is a flow chart illustrating a method for tuning a transducer according to certain principles of the present invention.

FIG. 12 is a flow chart illustrating a method for tuning a transducer according to certain principles of the present invention.

In step 1110, transducer 113 is coupled to transmitter amplifier 102 by setting switch S104 to position 'XT'.

In step 1120, receiver amplifier 108 is coupled to transducer 119 by setting switch S105 to position 'L'. Transducer 119 can be tuned to receive at the same carrier frequency as the magnetic field transmitted by transducer 113. This can be achieved by adjusting capacitance of C116.

In one application, transducer 119 is tested at a factory and preferred capacitance settings for each of multiple carrier frequencies are recorded in memory for later use. For example, transducer 119 is exposed to a wireless signal having a known carrier frequency and capacitance C106 is adjusted so that a maximal signal is received at receiver 108. Thus, transducer 119 can thereafter be tuned for optimally receiving a wireless signal at the carrier frequency based on capacitor settings as stored in memory.

In step 1122, a wireless signal is transmitted over transducer 113.

In step 1124, part of this transmitted signal is received over transducer 119.

In step 1126, the wireless signal as received over transducer 119 is measured at receiver 108.

In step 1130, capacitor C114 is adjusted so that an increased or maximal signal as generated by transducer 113 is received at the input of receiver amplifier 108 for a particular carrier frequency.

The strength of the wireless signal generated by transducer 113 as received at receiver 108 can be measured for tuning transducer 113. For example, the voltage level of the received signal at receiver 108 can indicate a relative signal strength of the received magnetic field generated by transducer 113. Other methods of measuring the power level of the wireless signal also can be employed to provide a relative measure of received signal strength.

Based on a power level of the received magnetic field at transducer 119, transducer 113 can be tuned to transmit an increased signal. In other words, capacitor C114 can be swept through a range of potential capacitance settings so that an optimal setting can be identified for a particular environment in which the transceiver device operates. Accordingly, settings can be learned and stored in memory for later use.

Figure 13:
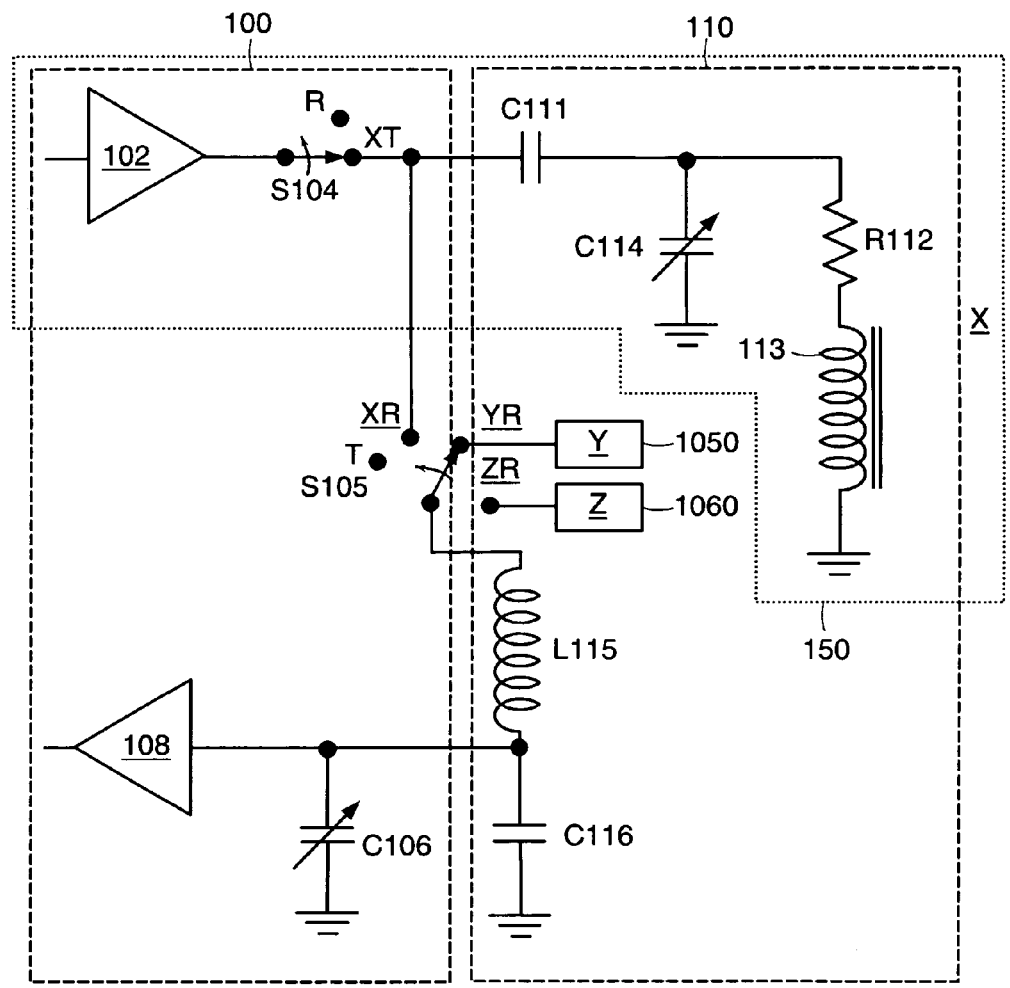
FIG. 13 is a circuit diagram of a transceiver system including multiple transducers for transmitting and receiving wireless signals according to certain principles of the present invention.

FIG. 13 is a circuit diagram of a transceiver system including multiple transducers for transmitting and receiving wireless signals according to certain principles of the present invention. As shown, switch S105 can be set to receive over either transducer X (transducer 113), transducer Y or transducer Z. Circuitry 150 for driving transducer 113 (transducer X) can be duplicated in circuits 1050 and 1060 for transmitting over transducer Y or Z as previously discussed. Accordingly, one of multiple transducers in a transducer device can be selected for transmitting while a different transducer can be selected for receiving. As discussed, one purpose for tuning a selected transducer is to increase its generated field strength.

In a specific example, transmitter amplifier 102 is coupled to transmit over transducer 113 by setting switch S104 to position 'XT' while a second transducer is selected via switch S105 to receive a wireless signal for tuning transducer 113. More specifically, switch S105 as shown is set to position 'YR' for receiving over transducer Y. Alternatively, switch S105 can be set to optional position T, thus disconnecting receiver 108 from all transducers to reduce power consumption or circuit interference. For this discussion, assume receiver 108 is coupled to receive over transducer Y and switch S104 is set to position 'YR' as shown.

As previously discussed, capacitor C111, capacitor C114 and transducer 113 form a tunable LC circuit, in which capacitor C114 is tuned to transmit at an optimal signal strength. Generally, a magnetic signal can be transmitted over transducer 113 while attributes of the transmitted magnetic signal are received and monitored over transducer Y. Hence, transducer 113 can be tuned to optimally transmit based on feedback received at transducer Y.

Conversely, a receiving transducer and related circuitry can be adjusted to optimally receive a signal that is transmitted by a selected transducer. For example, capacitor C106 can be adjusted to optimally receive a wireless signal as generated by transducer X.

Since coupling is based on induction, the orientation of a transducer can effect whether a signal is detected. If the transmitted magnetic signal does not couple to transducer Y due to its orientation, another transducer can be selected to monitor the wireless signal from the transducer X. For example, switch S105 can be switched to receive over transducer Z instead of transducer Y if no signal is detected. However, since transducers are typically located within less than several inches from each other, coupling is very likely for all transducers even when the transducers are positioned substantially orthogonal to each other.

Based on the techniques as discussed, any one of multiple transducers can be tuned for optimally transmitting or receiving during field use. That is, a transceiver device need not be returned to the factory for testing and adjusting characteristics of the circuit. It can be adjusted during normal operational use of the transceiver device. Thus, a transceiver device incorporating the principles of the present invention can adapt itself to provide optimal, improved or continuous coupling with a remote device despite operation of the device in an ever-changing environment. A power supply energizing the transceiver will last longer because the transceiver device is optimally linked to a target device. More specifically, circuits can be tuned so that minimal energy is dissipated while generating a maximum magnetic field.

Figure 14:
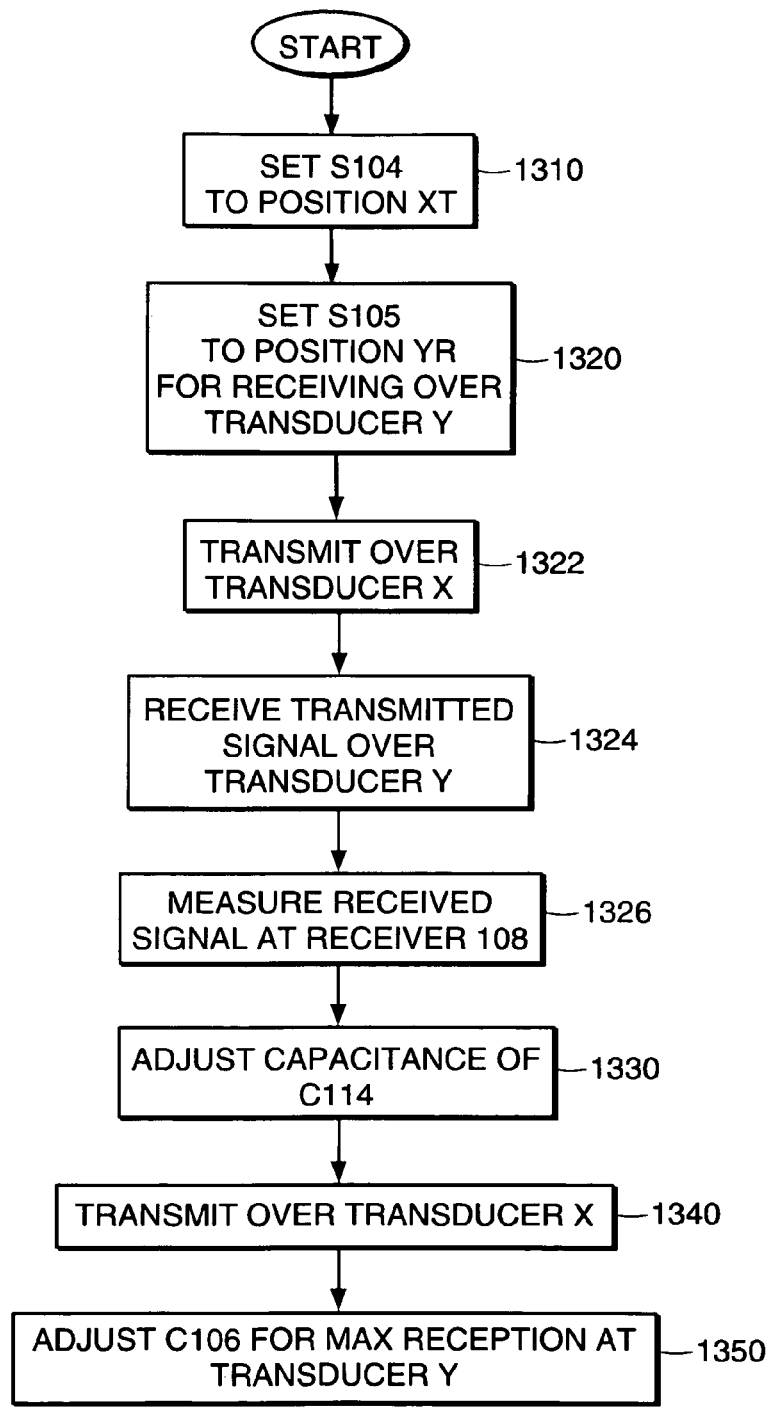
FIG. 14 is a flow chart illustrating a method for tuning a transducer for transmitting or receiving according to certain principles of the present invention.

FIG. 14 is a flow chart illustrating a method for tuning a transducer for transmitting or receiving according to certain principles of the present invention.

In step 1310, transducer 113 is coupled to transmitter amplifier 102 by setting switch S104 to position 'XT'.

In step 1320, receiver amplifier 108 is coupled to transducer Y by setting switch S105 to position 'YR'. Typically, transducer YR is tuned to receive at the same carrier frequency as transmitted by transducer 113. This can be achieved by adjusting capacitance at C106.

In step 1322, a wireless signal is transmitted over transducer X.

In step 1324, the transmitted signal from transducer X is received over transducer Y.

In step 1326, the signal as received over transducer Y is measured at receiver 108.

In step 1330, a capacitance provided by capacitor C114 is adjusted so that an increased, optimal or maximal signal as generated by transducer X is received at the input of receiver amplifier 108 for a particular carrier frequency.

In step 1340, a wireless signal is transmitted over transducer X.

In step 1350, a capacitance of C106 can be adjusted so that transducer Y and related circuitry is tuned for optimally receiving. For example, transducer Y and related circuitry are adjusted to optimally receive a wireless signal transmitted by transducer X.

The strength of the wireless signal generated by transducer 113 as received at receiver 108 over transducer Y is optionally measured for tuning transducer 113 or transducer Y. For example, the voltage level of the received signal at receiver 108 can indicate a relative signal strength of the received magnetic field generated by transducer 113. Other methods of measuring the power level of the wireless signal also can be employed to provide a relative measure of received signal strength.

Based on the actual or estimated power level of the received magnetic field at transducer 119, transducer X, transducer Y, or transducer Z can be selectively tuned to transmit or receive an increased magnetic signal. In one application, capacitor C114 or C106 can be swept through a range of potential capacitance settings to learn which setting is optimal for transmitting or receiving over a corresponding transducer.

Figure 15:
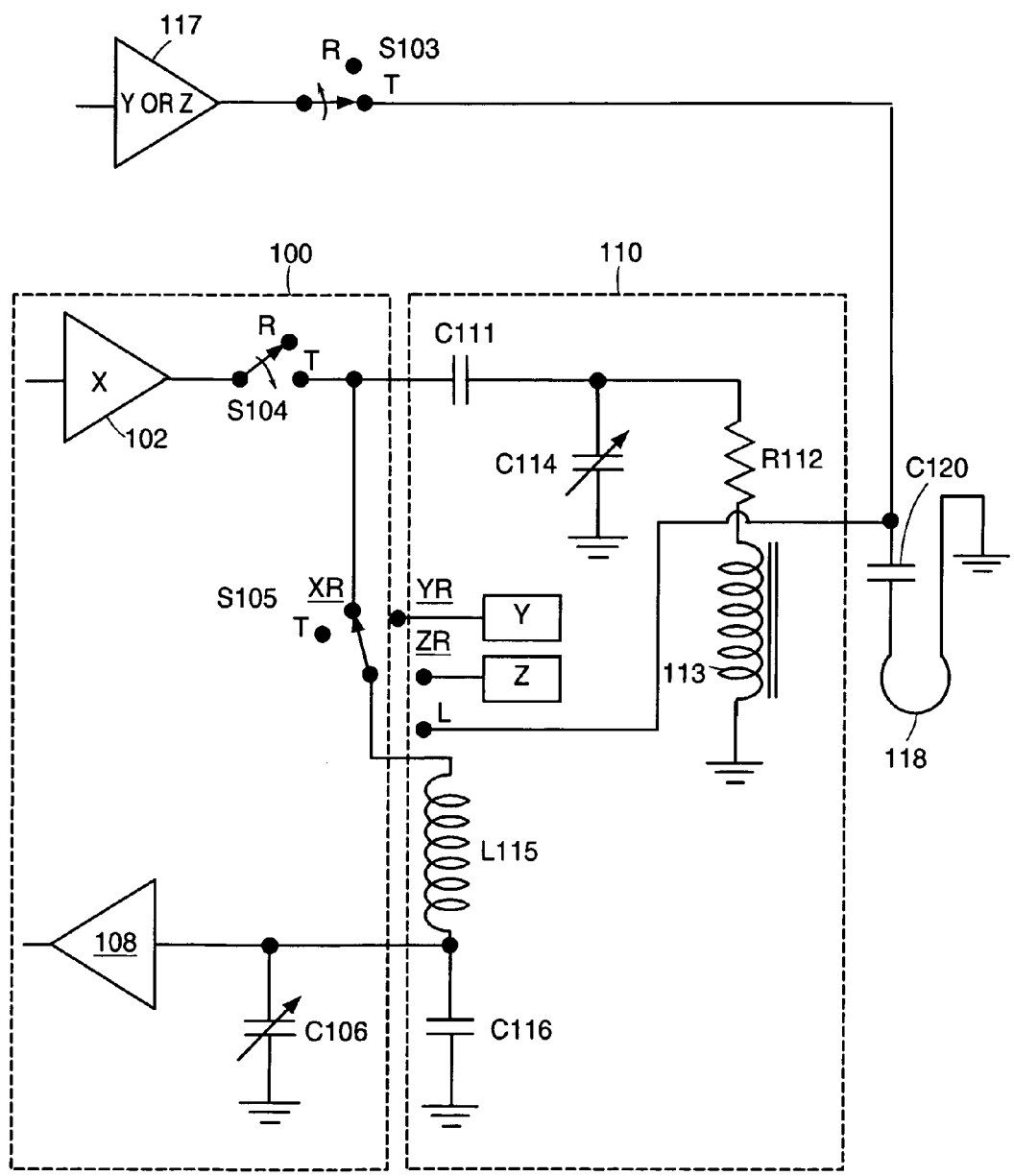
FIG. 15 is a circuit diagram for tuning a transducer for receiving according to certain principles of the present invention.

FIG. 15 is a circuit diagram for tuning a transducer for receiving according to certain principles of the present invention. As shown, transducer 118 is provided for generating a magnetic field that is received over selected transducer 113.

To adjust a transducer such as transducer X for receiving, receiver amplifier 108 of transceiver 100 is coupled to transducer 113 by setting switch S105 to position 'XR' while transmitter amplifier 102 is decoupled from transducer 113 by setting switch S104 to position 'R'. Transmitter 117 is coupled to transducer 118 through capacitor 120 when switch S103 is set to position 'T'.

Similar to the techniques as previously discussed, capacitor C106 can be adjusted to tune transducer 113 for receiving a wireless signal generated by transducer 118. Specifically, capacitor C106 can be swept through a range of potential capacitance settings to determine which setting provides an optimal setting for receiving over transducer 113.

Switch S105 also can be switched to select a mode for receiving over transducer Y or Z. Thus, transducer Y or Z can be optimally tuned for receiving a wireless signal generated by transducer 118.

Figure 16:
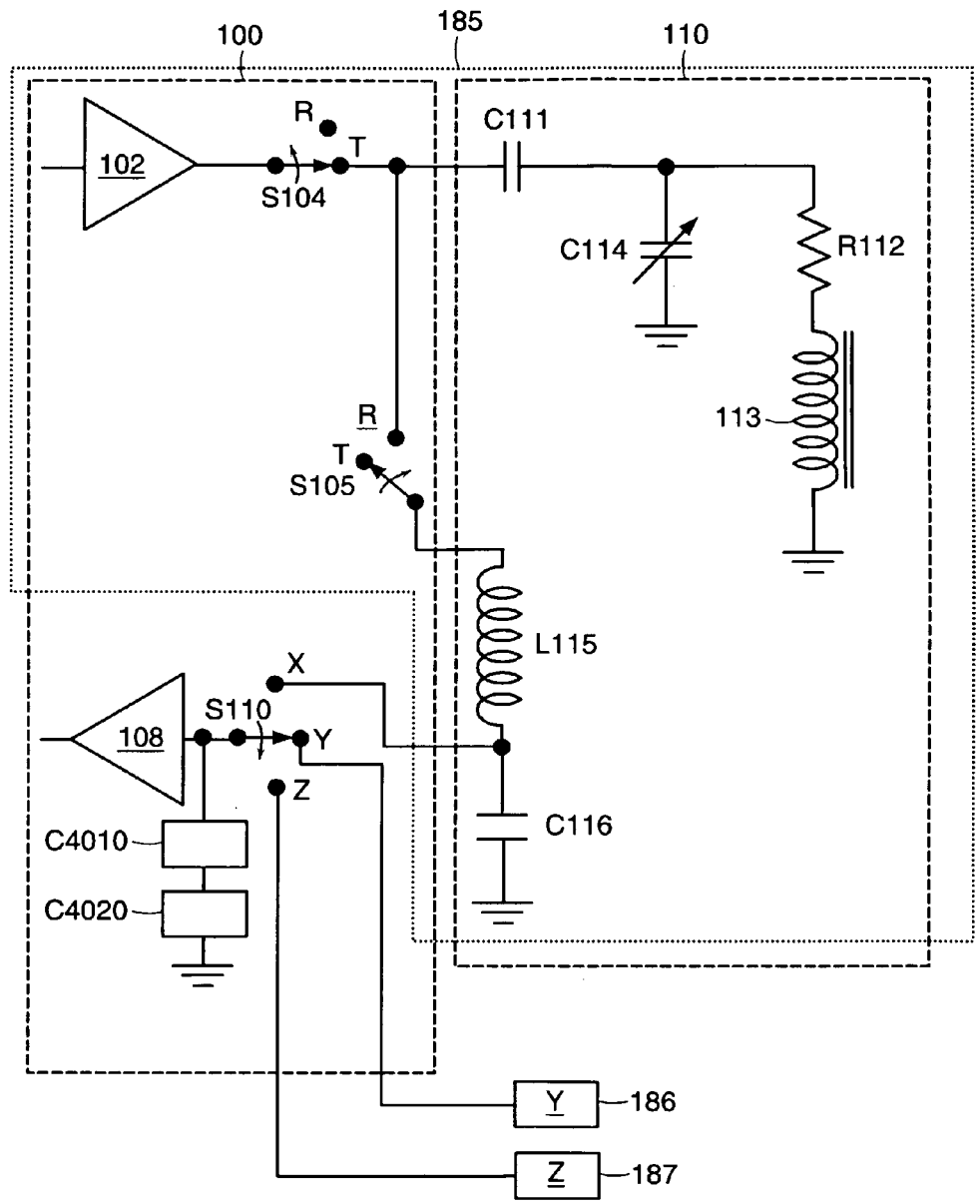
FIG. 16 is a circuit diagram for tuning one of multiple transducers according to certain principles of the present invention.

FIG. 16 is a circuit diagram for tuning one of multiple transducers according to certain principles of the present invention. As shown, separate circuits are provided for transmitting and receiving over a corresponding transducer. For example, circuit 185 is dedicated to transducer 113 for transmitting and receiving. Circuit 186 and circuit 187 include similar components as shown for circuit 185. However, circuit 186 and 187 are employed to receive and transmit over transducer Y of circuit 186 and transducer Z of circuit 187, respectively. In other words, circuit 185 can be replicated for transmitting and receiving over multiple transducers.

Circuitry including receiver 108, switch S110, capacitor bank C4010 and switch bank S4020 can be disposed so that they are common to all circuits. For example, switch S110 can be switched to receive over one of multiple transducers such as orthogonally positioned transducers X, Y and Z. As shown, receiver 108 is coupled to transducer Y. Since a portion of circuitry is shared among transducers, specific circuitry such as capacitor bank C4010, receiver 108 and switch bank S4020 are not needlessly duplicated for each circuit.

In a transmit mode, switch S105 as well as complementary switches disposed in circuit 186 and circuit 187 can be set to position 'T' for decoupling receiver 108 from a corresponding transducer.

Based upon this configuration, a single transducer or multiple transducers can be tuned and driven at the same time using a common carrier frequency or different carrier frequencies. In a receive mode, a selected one of multiple transducers can be individually tuned for receiving a wireless signal via coupling provided by switch S110.

Figure 17:
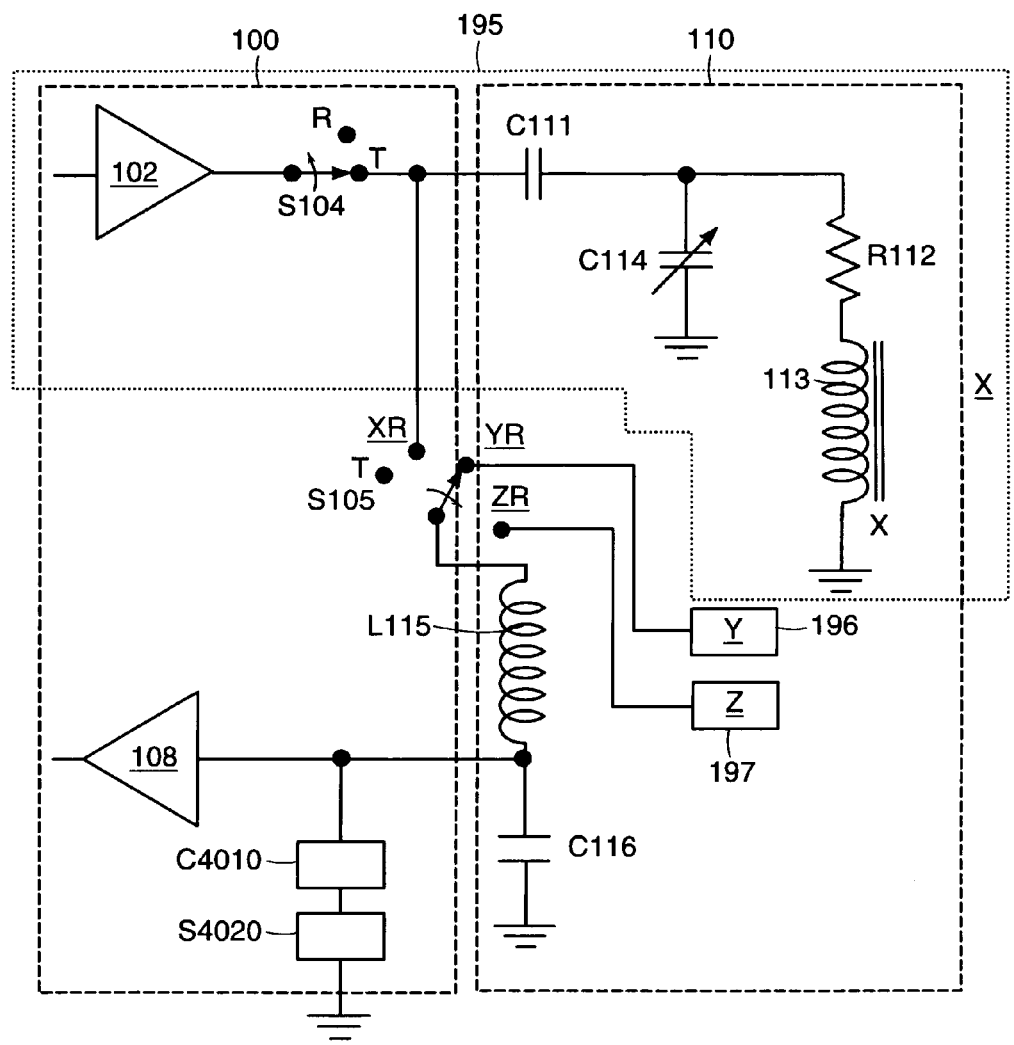
FIG. 17 is a circuit diagram for transmitting and receiving over one of multiple transducers according to certain principles of the present invention.

FIG. 17 is a circuit diagram for transmitting and receiving over one of multiple transducers according to certain principles of the present invention. As shown, minimal circuit components can be employed to tune a transducer for transmitting or receiving at a particular carrier frequency.

Switch S105 selects which of multiple transducers such as transducer X, transducer Y (in circuit 196) or transducer Z (in circuit 197) will be tuned for receiving at receiver 108. Common circuitry shared by the multiple transducers includes receiver 108, capacitor bank C4010, switch bank S4020, C116 and L115. Generally, the circuitry shown in circuit 195 can be replicated in circuit 196 to receive/transmit over transducer Y and circuit 197 to receive/transmit over transducer Z.

To transmit over a particular transducer, switch S104 or its complement in circuit 196 or 197 is set to position 'T' while switch S105 is set to receive over another transducer. For illustrative purposes, as shown in FIG. 17, transmitter 102 is coupled to drive transducer X while receiver 108 is coupled to receive over transducer Y.

Based upon the circuit configuration as shown, a selected transducer can be tuned for optimally transmitting or receiving a wireless signal. This technique of adjusting each transducer via capacitance provided by capacitor bank 4010 simplifies tuning multiple transducers, each of which potentially has its own unique electronic characteristics. For example, electronic characteristics of transducer devices can vary from component to component as a result of manufacturing tolerances. Consequently, a single adjustable circuit can be adjusted to dynamically tune each of multiple unique transducer devices for receiving or transmitting.

Figure 18:
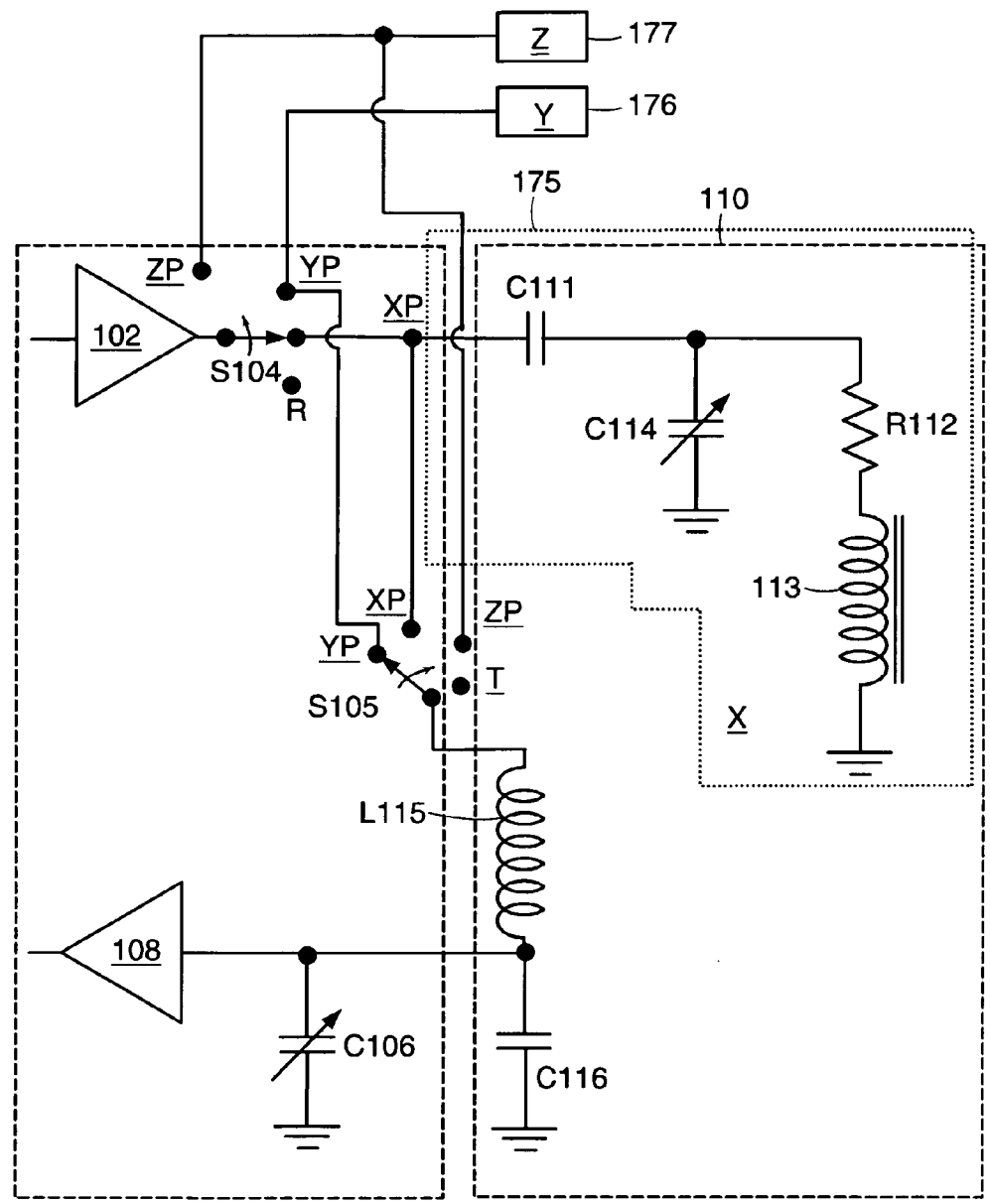
FIG. 18 is a circuit diagram for tuning one of multiple transducers according to certain principles of the present invention.

FIG. 18 is a circuit diagram for tuning one of multiple transducers according to certain principles of the present invention. As shown, minimal circuit components can be employed to tune a selected transducer for transmitting or receiving at a particular carrier frequency. Components in circuit 175 including C111, C114, R112 and transducer 113 (transducer X) can be duplicated in circuit 176 and circuit 177. Circuit 176 includes transducer Y while circuit 177 includes transducer Z.

Switch S105 can be switched to select which, if any, of multiple receivers will be coupled to receiver 108 for receiving. As shown, switch S105 is set to position YP for receiving a wireless signal over transducer Y.

In a similar manner, switch S104 can be switched to select which, if any, of multiple transducers will be coupled to transmitter 102 for transmitting.

Based on techniques as previously discussed, one transducer can be tuned for transmitting while another transducer can be tuned for receiving.

Figure 20:
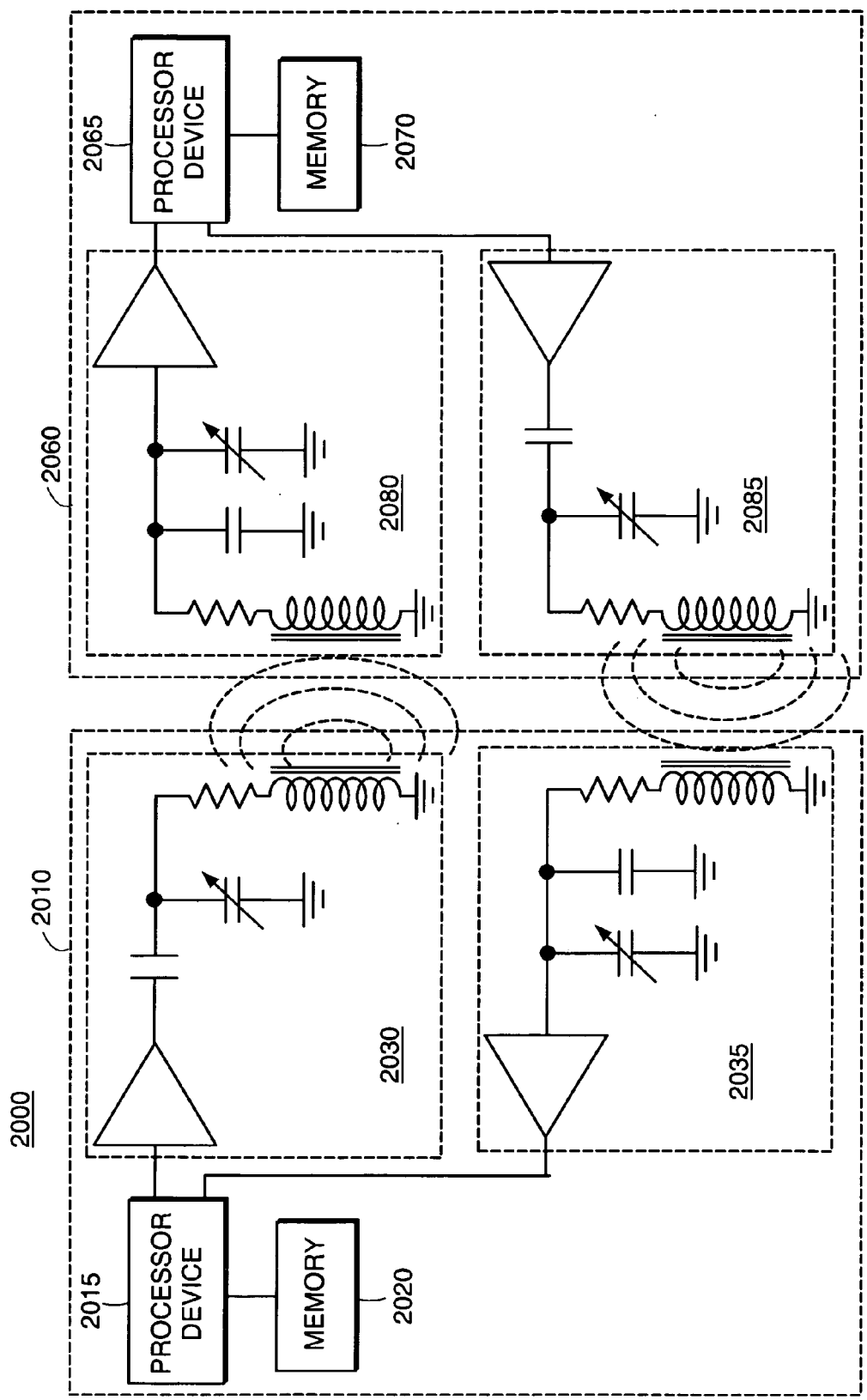
FIG. 20 is a block diagram illustrating a wireless system for two-way communications according to certain principles of the present invention.

FIG. 20 is a block diagram illustrating a wireless system for two-way communications according to certain principles of the present invention. The techniques as previously discussed can be used in this embodiment to dynamically tune a transducer dedicated for either transmitting or receiving.

As shown, transceiver device 2010 and transceiver device 2060 communicate with each other via wireless signals. Each transceiver device can include at least one dedicated transmitter 2030, 2085 (transducer and related circuitry) for transmitting a wireless signal and at least one dedicated receiver 2035, 2080 (transducer and related circuitry) for receiving. A switch can be provided so that one of multiple uniquely oriented transducer devices within a transmitter or receiver can be selected and dynamically tuned for transmitting or receiving a wireless signal as previously discussed.

In a forward direction between transceiver 2010 and transceiver 2060, processor 2015 generates encoded data and transmits a wireless signal from transmitter 2030 at a selected carrier frequency. For example, a dedicated transducer of transmitter 2030 can be dynamically tuned to transmit at a selected carrier frequency. Receiver 2080 is dynamically tuned to receive at the selected carrier frequency and decode the received wireless signal at processor 2065.

In a reverse direction, processor 2065 generates encoded data and transmits a wireless signal from transmitter 2085 at a dynamically selected carrier frequency. Receiver 2035 is dynamically tuned to receive over the selected carrier frequency and decode the received wireless signal at processor 2015.

When full duplex communication is supported between transceiver 2010 and 2060, a first carrier frequency can be utilized to transmit/receive information in one direction while a different carrier frequency can be used to transmit/receive information in the opposite direction. Time division multiplexing techniques also can be used to transmit and receive information over a commonly used carrier frequency.

Based on this configuration as shown in FIG. 20, a single dedicated transducer device can be dynamically or electronically tuned for transmitting or receiving at a particular carrier frequency. In the event that other wireless devices are utilizing a similar carrier frequency, interference typically can be avoided during operational use in the field by dynamically tuning a transmitter/receiver pair of the transducers to transmit and receive at another carrier frequency.

Figure 21:
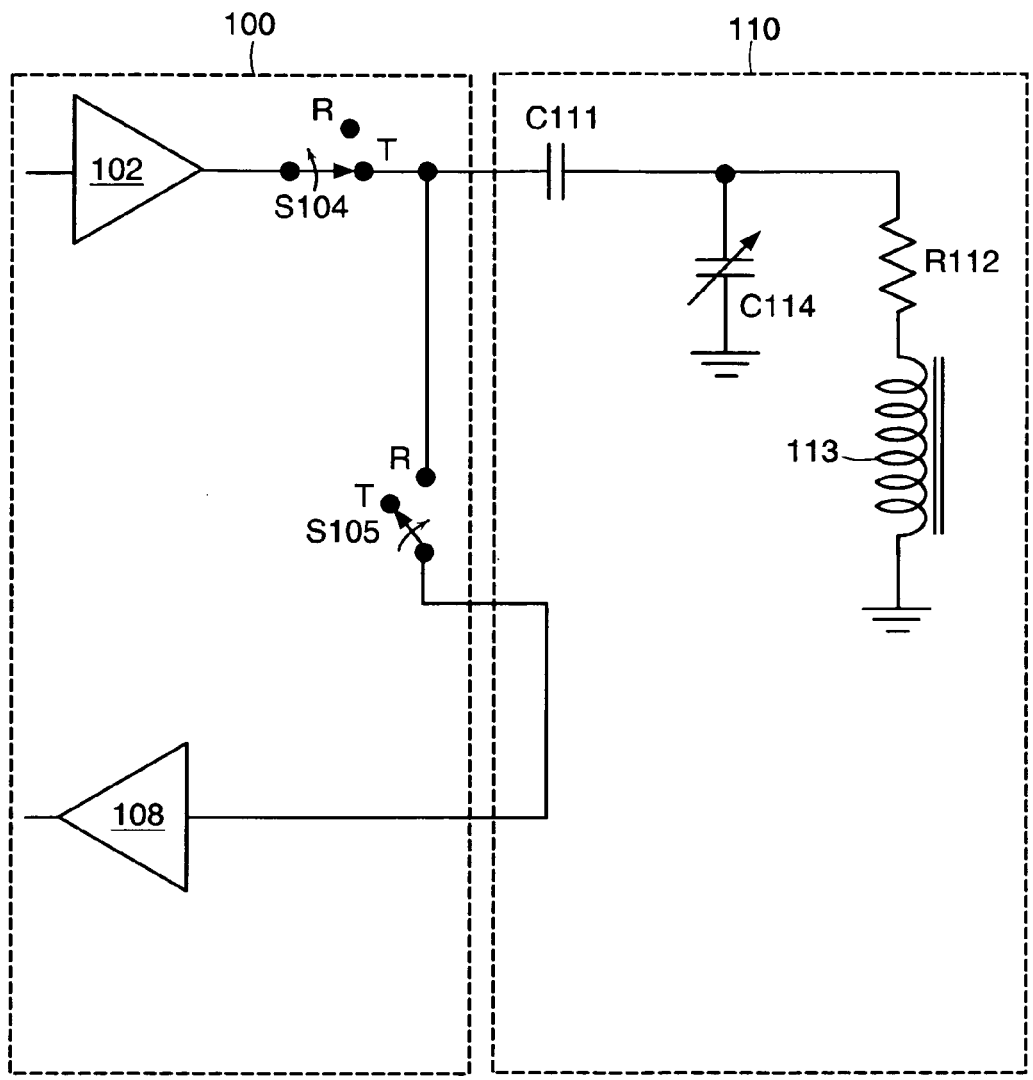
FIG. 21 is a circuit diagram illustrating a transceiver system for transmitting and receiving a wireless signal over a single transducer according to certain principles of the present invention.

FIG. 21 is a circuit diagram illustrating a transceiver system for transmitting and receiving a wireless signal over a single transducer according to certain principles of the present invention. As shown, certain circuit elements have been eliminated from the transceiver system as shown in FIG. 2. More specifically, inductor L115 and capacitors C106 and C116 have been eliminated.

The transceiver system as shown in FIG. 21 supports two-way communication over a single transducer device using fewer circuit components. Consequently, the wireless communication system according to the principles of the present invention can occupy a smaller volume and thus fit into yet smaller wireless transceiver devices.

To select a transmit mode, both switches S104 and S105 are set to position T. Capacitor C114 is adjusted to tune transducer 113 for transmitting at a selected carrier frequency similar to the circuits as previously discussed.

To select a receive mode, both switches S104 and S105 are set to position R. Capacitor C114 is adjusted to tune transducer 113 for receiving at a selected carrier frequency. A voltage proportional to a received wireless signal at transducer 113 is generated at the node connecting C111, C114 and R112. This generated voltage or signal is coupled to receiver amplifier 108 through the circuit path including switch S105 and capacitor C111.

Figure 22:
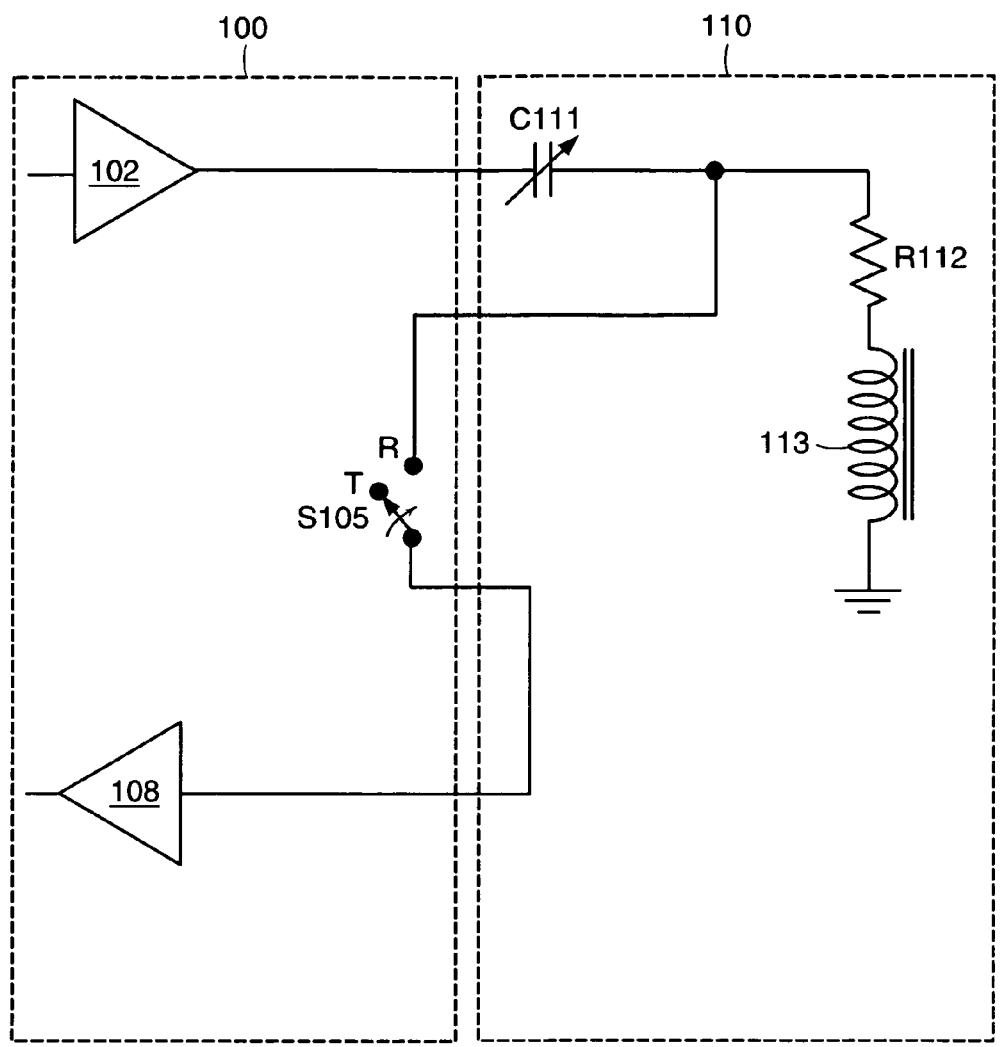
FIG. 22 is a circuit diagram illustrating yet another transceiver system for transmitting and receiving a wireless signal over a single transducer according to the principles of the present invention.

FIG. 22 is a circuit diagram illustrating yet another transceiver system for transmitting and receiving a wireless signal over a single transducer according to certain principles of the present invention. As shown, adjustable capacitor C114 and switch S104 have been eliminated from the diagram as shown in FIG. 21. Also, capacitor C111 has been modified so that it is adjustable. In a addition to potentially occupying yet a smaller volume, the circuit includes only one switch that must be controlled for selecting either a transmit or receive mode.

To select a transmit mode, switch S105 is set to position T. In this embodiment, capacitor C111 is adjusted to tune transducer 113 for transmitting at a selected carrier frequency. Transmitter 102 is controlled to produce an output voltage and drive transducer 113.

To select a receive mode, switch S105 is set to position R and the output of transmitter 102 is driven to a virtual ground. When the end of capacitor C111 is switched to ground by setting the output of transmitter 102, capacitor C111 is effectively disposed in parallel with the combination of R112 and transducer 113. Similar to the principles as previously discussed, capacitor C111 is adjusted to tune transducer 113 for receiving at a selected carrier frequency. During reception, a voltage proportional to a received wireless signal is generated at the node connecting C111, R112 and S105. The generated voltage or signal is coupled to receiver amplifier 108 through the low impedance circuit path including switch S105.

Figure 23:
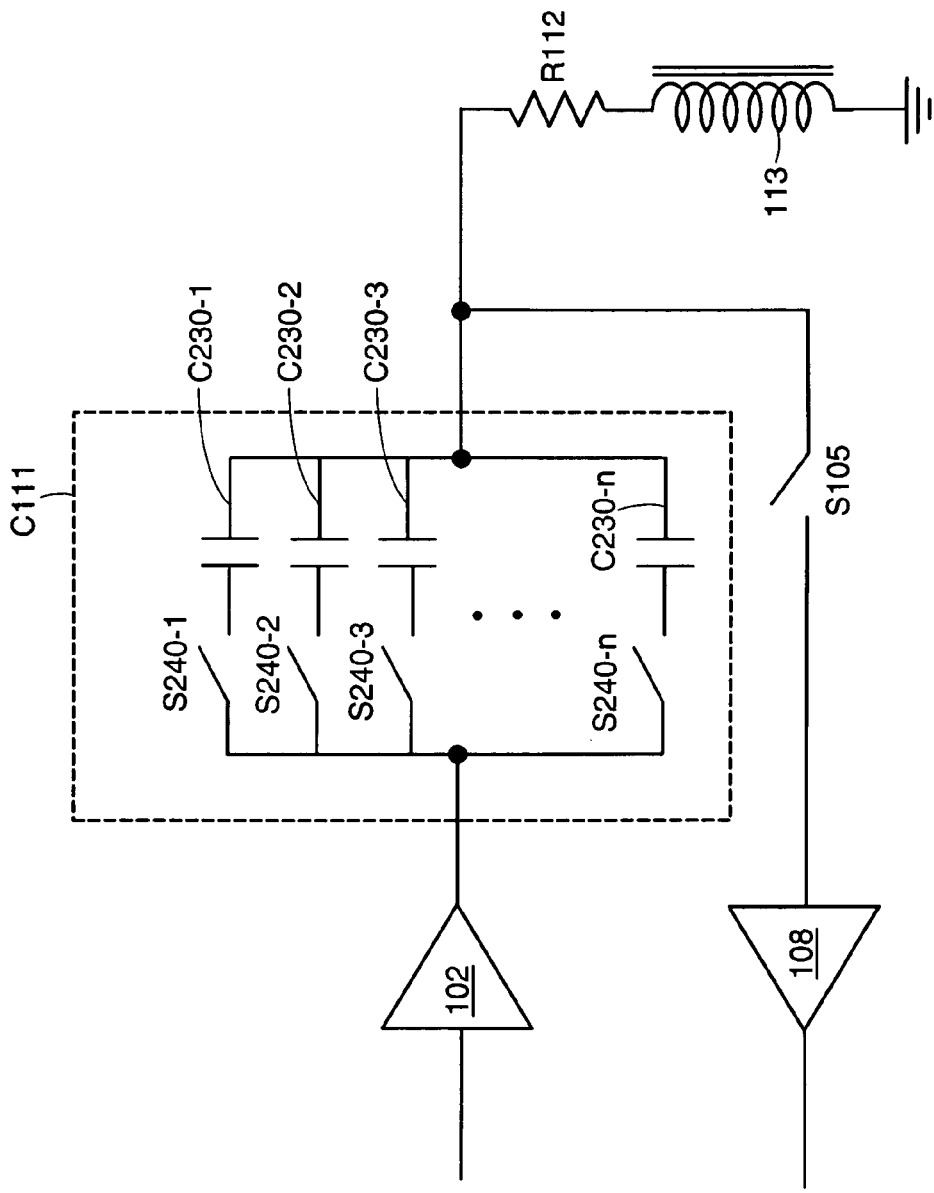
FIG. 23 is a detailed circuit diagram illustrating a transceiver system for transmitting and receiving a wireless signal according to certain principles of the present invention.

FIG. 23 is a detailed circuit diagram illustrating a transceiver system for transmitting and receiving a wireless signal according to certain principles of the present invention. Generally, FIG. 23 is a more detailed circuit diagram illustrating a system and method for providing an adjustable capacitance at C111 as shown in FIG. 22.

A capacitor bank including capacitor C230-1, C230-2, C230-3 . . . C230-n are selectively coupled to the output of transmitter 102 via corresponding switches S240-1, S240-2, S240-3 . . . S240-n. Similar to the principles as previously discussed, characteristics of the circuit are adjusted to tune transducer 113 for transmitting or receiving. More specifically, capacitors C230 are switched in and out to adjust a combined capacitance of C111 for transmitting or receiving a wireless signal over transducer 113.

Figure 24:
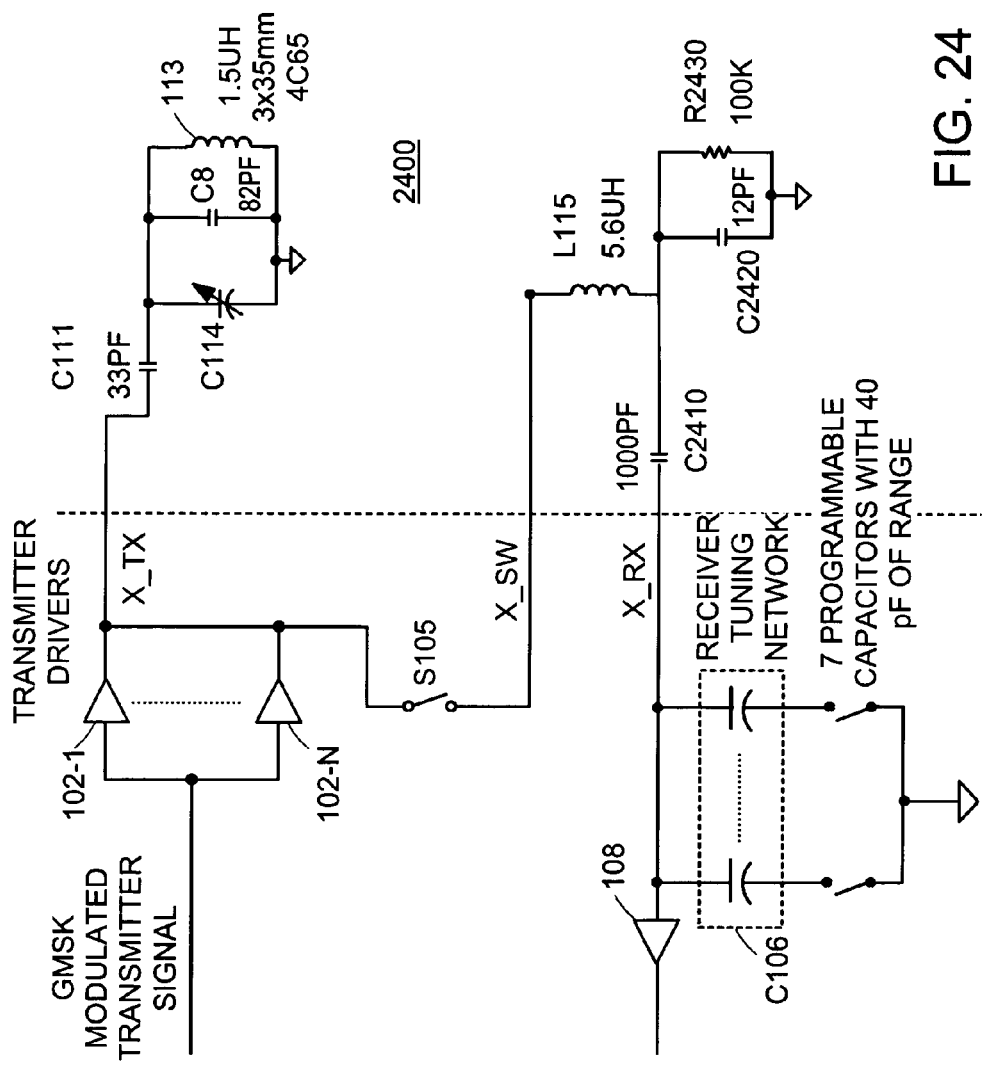
FIG. 24 is a detailed circuit diagram illustrating a transceiver system according to certain principles of the present invention.

FIG. 24 is a detailed circuit diagram illustrating a transceiver system for transmitting and receiving a wireless signal according to certain principles of the present invention.

As shown, C2410 is a DC blocking capacitor to keep DC voltages from input of receiver 108. C2420 can be used to shift the resonant frequency of the receiver (e.g., from 12 to 13 MHz) while R2430 can be adjusted to change the Q of the receiver 108. This tuning circuit can ensure that the proper impedance is present at the frequency of use. This may be necessary due to variations in the coil impedance.

A variable capacitor C106 can be used for tuning the receiver. This can be achieved in manufacturing by monitoring the received signal strength and adjusting capacitor C106.

Automatic tuning of transducer 113 for receiving on receiver 108 can be achieved using a firmware driven capacitor table containing multiple programmable capacitors with 40 pF of range. This capacitor table can be loaded into memory when a transceiver system 2400 is turned on.

In one application, transceiver system 2400 is a TDD (Time Division Duplex) system that can be configured to alternately transmit and receive in synchronization with a base transceiver unit. During a transmit frame, switch S105 is open and one or more of transmitter drivers 102-1 . . . 102-n can be selectively activated (to control power output levels) and to apply a 50% duty GMSK modulated square wave to transducer 113 and related circuitry. This front-end network, including transducer 113, and impedance scaling capacitors form a series tuned band pass filter that is centered at the carrier frequency. The result is a GMSK modulated sine wave coil current.

During receive mode, a low impedance of the transmitter driver 102 can be removed from the circuit. This can be accomplished by setting the drivers to a high output impedance state. Switch S105 can be closed and the receiver tuning network switches associated with C106 can be adjusted. In this mode, the series tuned band pass response of the transmitter path has been converted into a purely parallel band pass response.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for supporting communication comprising the steps of:
    coupling one of multiple transducers to a circuit to transmit or receive a magnetic field;
    adjusting characteristics of the circuit depending on which of the multiple transducers is coupled to the circuit;
    intermittently adjusting characteristics of the circuit during use based upon feedback to more efficiently transmit or receive over one of the multiple transducers;
    coupling a first transducer of the multiple transducers to the circuit for transmitting;
    coupling a second transducer of the multiple transducers to the circuit for receiving;
    transmitting a signal over the first transducer and receiving the signal over the second transducer; and
    tuning the first transducer and the circuit for transmitting a magnetic field based on feedback from the second transducer receiving the magnetic field.

2. A method as in claim 1, wherein a capacitance of the circuit is adjusted to tune the transducer.

3. A method as in claim 1, wherein the circuit is adjusted to independently tune the transducer for transmitting or receiving at different time intervals.

4. A method as in claim 1 further comprising the step of:
    selecting a setting of the circuit via electronic switching to tune the transducer.

5. A method as in claim 1 further comprising the step of:
    positioning each of the multiple transducers along a unique axis with respect to each other.

6. A method as in claim 5 further comprising the step of:
    selecting from which of the multiple transducers to transmit or receive a magnetic field; and
    tuning the selected transducer to support a wireless link with a remote transceiver device having a single transducer that transmits and receives data.

7. A method as in claim 1 further comprising the step of:
    orthogonally positioning three transducers with respect to each other.

8. A method as in claim 1 further comprising the step of:
    adjusting an impedance of the circuit to tune a transducer for transmitting or receiving.

9. A method as in claim 1 further comprising:
    tuning the second transducer and the circuit for receiving based on a received signal strength of a magnetic field generated by the first transducer.

10. A method as in claim 1 further comprising:
    sweeping through a range of circuit settings to determine which of multiple settings is optimal for transmitting or receiving over a selected transducer.

11. A method as in claim 10 further comprising:
    learning which of multiple settings is optimal and storing corresponding information in memory.

12. A method as in claim 1 further comprising:
    reducing power consumption of the circuit by increasing a magnetic signal generated by a selected transducer based upon adjustments to the circuit.

13. A method as in claim 1 further comprising:
    switching selected capacitors of a capacitor bank to ground via switches to tune a transducer for transmitting or receiving.

14. A method as in claim 1 further comprising:
    storing circuit setting information in memory regarding how to set a circuit for receiving or transmitting.

15. A method as in claim 1 further comprising:
    retrieving circuit setting information from memory and adjusting characteristics of the circuit to transmit or receive over a transducer.

16. A method as in claim 1 further comprising:
    adjusting the circuit to transmit or receive over the transducer at a selected carrier frequency.

17. A method as in claim 16 further comprising:
    modulating digital data on the carrier frequency to transmit information to a target receiver.

* * * * *